United States Patent
Ishii et al.

(10) Patent No.: US 11,308,108 B2
(45) Date of Patent: Apr. 19, 2022

(54) MAINTENANCE INFORMATION SHARING DEVICE, MAINTENANCE INFORMATION SHARING METHOD, AND NON-TRANSITORY COMPUTER READABLE STORAGE MEDIUM

(71) Applicant: Yokogawa Electric Corporation, Tokyo (JP)

(72) Inventors: Yosuke Ishii, Tokyo (JP); Yasuki Sakurai, Tokyo (JP); Kenji Oishi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 884 days.

(21) Appl. No.: 15/464,433

(22) Filed: Mar. 21, 2017

(65) Prior Publication Data
US 2017/0277758 A1  Sep. 28, 2017

(30) Foreign Application Priority Data

Mar. 23, 2016 (JP) .............................. JP2016-058961

(51) Int. Cl.
*G06F 16/248* (2019.01)
*G06F 16/176* (2019.01)
(Continued)

(52) U.S. Cl.
CPC .......... *G06F 16/248* (2019.01); *G06F 16/176* (2019.01); *G06Q 10/103* (2013.01);
(Continued)

(58) Field of Classification Search
CPC ..... G06F 16/248; G06F 16/176; G06Q 10/20; G06Q 50/04; G06Q 10/103; H04L 67/12; H04L 67/02; Y02P 90/30
See application file for complete search history.

(56) References Cited

U.S. PATENT DOCUMENTS

| 8,400,548 B2 | 3/2013 | Bilbrey et al. |
| 2002/0033946 A1 * | 3/2002 | Thompson ................ B64F 5/60 356/394 |

(Continued)

FOREIGN PATENT DOCUMENTS

| CA | 2861968 A1 * | 10/2013 | ............. G06Q 10/20 |
| EP | 1501029 A2 | 1/2005 | |

(Continued)

*Primary Examiner* — Ashish Thomas
*Assistant Examiner* — Yohanes D Kelemework
(74) *Attorney, Agent, or Firm* — Sughrue Mion, PLLC

(57) ABSTRACT

A maintenance information sharing device includes a maintenance record obtainer configured to obtain a maintenance record of a maintenance target, a maintenance record storage configured to associate the maintenance record obtained by the maintenance record obtainer with identification information for identifying the maintenance target, the maintenance record storage storing the maintenance record associated with the identification information, a maintenance information generator configured to generate maintenance information based on the maintenance record associated with the identification information and stored by the maintenance record storage, a maintenance information storage which stores the maintenance information generated by the maintenance information generator, a searcher configured to search the maintenance information stored by the maintenance information storage based on the identification information, and a maintenance information provider configured to provide the maintenance information searched by the searcher.

20 Claims, 14 Drawing Sheets

(51) Int. Cl.
  *G06Q 10/10*  (2012.01)
  *G06Q 50/04*  (2012.01)
  *G06Q 10/00*  (2012.01)
  *H04L 29/08*  (2006.01)
  *H04L 67/02*  (2022.01)
  *H04L 67/12*  (2022.01)

(52) U.S. Cl.
  CPC .............. *G06Q 10/20* (2013.01); *G06Q 50/04* (2013.01); *H04L 67/02* (2013.01); *H04L 67/12* (2013.01); *Y02P 90/30* (2015.11)

(56) References Cited

U.S. PATENT DOCUMENTS

| | | | |
|---|---|---|---|
| 2008/0046254 A1* | 2/2008 | Nuno | G06Q 10/20 705/305 |
| 2011/0164163 A1 | 7/2011 | Bilbrey et al. | |
| 2014/0337429 A1* | 11/2014 | Asenjo | G06Q 10/0637 709/204 |
| 2017/0011359 A1* | 1/2017 | Endo | G05B 19/418 |
| 2017/0118374 A1* | 4/2017 | Tsujiguchi | G06F 21/84 |
| 2018/0088566 A1* | 3/2018 | Billi-Duran | G05B 19/41885 |

FOREIGN PATENT DOCUMENTS

| | | |
|---|---|---|
| JP | 2003-140735 A | 5/2003 |
| JP | 2003-157113 A | 5/2003 |
| WO | 2010/022185 A1 | 2/2010 |
| WO | 2013/049248 A2 | 4/2013 |

\* cited by examiner

FIG. 8

| FACILITY ID | WORK ID | MAINTENANCE ITEM | PROGRESS | SCHEDULED DATE | PERFORMANCE DATE/TIME | IMM ID |
|---|---|---|---|---|---|---|
| F4020 | 1 | FLOW AMOUNT CHECK | COMPLETE | 2016/2/1 | 2016/2/1 13:00 | 0x0001 |
| F4020 | 2 | VIBRATION CHECK | COMPLETE | 2016/2/1 | 2016/2/1 13:05 | 0x0001 |
| F4020 | 3 | LEAKAGE CHECK | COMPLETE | 2016/2/1 | 2016/2/1 13:10 | 0x0001 |
| P000001 | 4 | TEMPERATURE CHECK | COMPLETE | 2016/2/5 | 2016/2/5 9:30 | 0x0002 |
| P000001 | 5 | PRESSURE CHECK | COMPLETE | 2016/2/5 | 2016/2/5 10:00 | 0x0002 |
| T1001 | 6 | INDICATED VALUE CHECK | | 2016/2/29 | | |

FIG. 9

| IMM ID | SCRIPT | FILE UPDATE DATE/TIME | MOVING IMAGE PLAYING POSITION | FILE PATH |
|---|---|---|---|---|
| 0x0001 | FLOW AMOUNT CHECK WAS STARTED | 2016/2/1 13:03 | 0:33 | file://C:/home/foo/a.mpeg |
| 0x0001 | FLOW AMOUNT CHECK WAS COMPLETED | 2016/2/1 13:03 | 2:33 | file://C:/home/foo/a.mpeg |
| 0x0001 | VIBRATION CHECK WAS STARTED | 2016/2/1 13:08 | 0:15 | file://C:/home/baa/b.mpeg |
| 0x0001 | VIBRATION WAS LARGER THAN USUAL | 2016/2/1 13:08 | 1:54 | file://C:/home/baa/b.mpeg |
| 0x0002 | IMAGE OF TEMPERATURE INDICATOR OF P0000001 | 2016/2/5 13:08 | | file://C:/home/zoo/c.jpg |
| 0x0002 | IMAGE OF PRESSURE INDICATOR OF P0000001, PRESSURE WAS HIGH | 2016/2/5 13:09 | | file://C:/home/zoo/d.jpg |

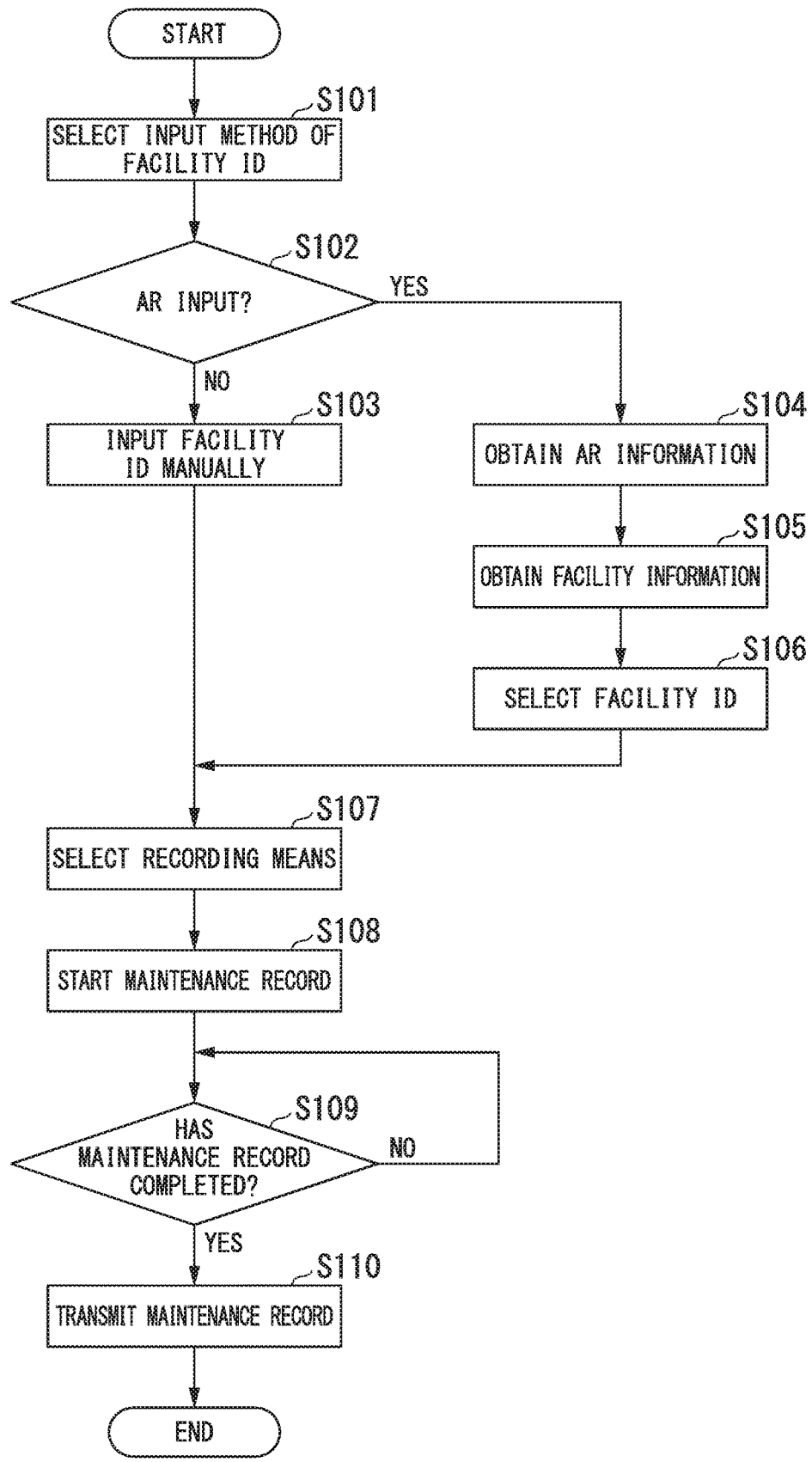

MAINTENANCE INFORMATION SHARING DEVICE, MAINTENANCE INFORMATION SHARING METHOD, AND NON-TRANSITORY COMPUTER READABLE STORAGE MEDIUM

BACKGROUND

Technical Fields

The disclosure relates to a maintenance information sharing device, a maintenance information sharing method, and a non-transitory computer readable storage medium.

Priority is claimed on Japanese Patent Application No. 2016-058961, filed Mar. 23, 2016, the contents of which are incorporated herein by reference.

Related Art

In a plant and a factory (hereinafter, called simply "plant" as a generic name of them), various maintenance work is performed, and advanced maintenance technology and capability (called "maintenance skill") are required in some maintenance work. The plant includes an industrial plant refining petroleum and manufacturing chemical products, a plant managing and controlling a wellhead (for example, a gas field and an oil field), a plant managing and controlling a generation of electric power (for example, hydro power, thermal power, and nuclear power), a plant managing and controlling a power harvesting (for example, solar power and wind power), a plant managing and controlling water supply and sewerage systems, a dam, and so on. In the maintenance work, a maintenance skill which is difficult to be described in a manual may be required, and a worker whose skill level is low is guided by a worker who has an advanced maintenance skill (called "advanced skill worker") and performs maintenance work under the guidance. However, in a geographically distant plant where there is no advanced skill worker, a worker may receive a guidance of the maintenance work from the advanced skill worker who is in a distant place by using a video call system or a telephone, and the worker may perform the maintenance work. In the guidance of the maintenance work by using the video call system, for example, the advanced skill worker who is in the distant place checks an image of a maintenance target device which has been photographed by the worker, and the advanced skill worker gives an instruction of an appropriate work to the worker.

For example, the situation of the guidance of the maintenance work by using the video call system is recordable as a movie file in which the image has been recorded. A worker who performs a similar maintenance work later can obtain a maintenance skill about the maintenance work recorded in the image by playing and viewing the movie file. Information about recording date and time or the like is added to the movie file. Contents of the maintenance work can be added to a file name of the movie file. The worker who performs the similar maintenance work later can search the movie file about the maintenance work to be performed based on the information of the recording date and time and a file name added to the movie file.

There is a technology of sharing, between terminals in distant places, an image obtained by using an AR (Augmented Reality) technology in the video call system (for example, U.S. Pat. No. 8,400,548).

However, since the maintenance skill which is recordable in an image is a part of skill required for the maintenance work, there is a maintenance skill which cannot be shared only by viewing the image in which the maintenance work has been recorded. For example, the maintenance work includes a work performed by checking text information, such as a work diary or a repair record. Moreover, the maintenance work includes a work performed by checking data of a sensor, a measurer, a control device, or a field device. Since the maintenance skill which cannot be represented only with the image included in the record of the video call system is included in the work of checking these text information and data, there is a case that the maintenance information which includes the maintenance skill cannot be shared only by viewing the image in which the maintenance work has been recorded.

There are a lot of devices which are maintenance targets in the plant, and the maintenance work of two or more maintenance items is performed to each of the devices. For this reason, it takes a lot of time and labor to search an image file corresponding to the maintenance work to be performed based on the information about the recording date and time or the file name, and it also takes a lot of time and labor to find a recorded part which should be played in the movie file. Therefore, there is a case that it is difficult to share the maintenance information.

SUMMARY

A maintenance information sharing device may include a maintenance record obtainer configured to obtain a maintenance record of a maintenance target, a maintenance record storage configured to associate the maintenance record obtained by the maintenance record obtainer with identification information for identifying the maintenance target, the maintenance record storage storing the maintenance record associated with the identification information, a maintenance information generator configured to generate maintenance information based on the maintenance record associated with the identification information and stored by the maintenance record storage, a maintenance information storage which stores the maintenance information generated by the maintenance information generator, a searcher configured to search the maintenance information stored by the maintenance information storage based on the identification information, and a maintenance information provider configured to provide the maintenance information searched by the searcher.

Further features and aspects of the present disclosure will become apparent from the following detailed description of exemplary embodiments with reference to the attached drawings.

BRIEF DESCRIPTION OF THE DRAWINGS

FIG. 8 is a drawing illustrating an example of the work plan/history table of IMM in the embodiment.

FIG. 9 is a drawing illustrating an example of the contents table of IMM in the embodiment.

FIG. 10 is a flow chart illustrating an example of the record operation of the maintenance information by the terminal device in the embodiment.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a maintenance information sharing device, a maintenance information sharing method, and a non-transitory computer readable storage medium which can share maintenance information.

The maintenance information sharing device, the maintenance information sharing method, the non-transitory computer readable storage medium in an embodiment of the present invention will be described below in detail, with reference to drawings.

Figure 1:
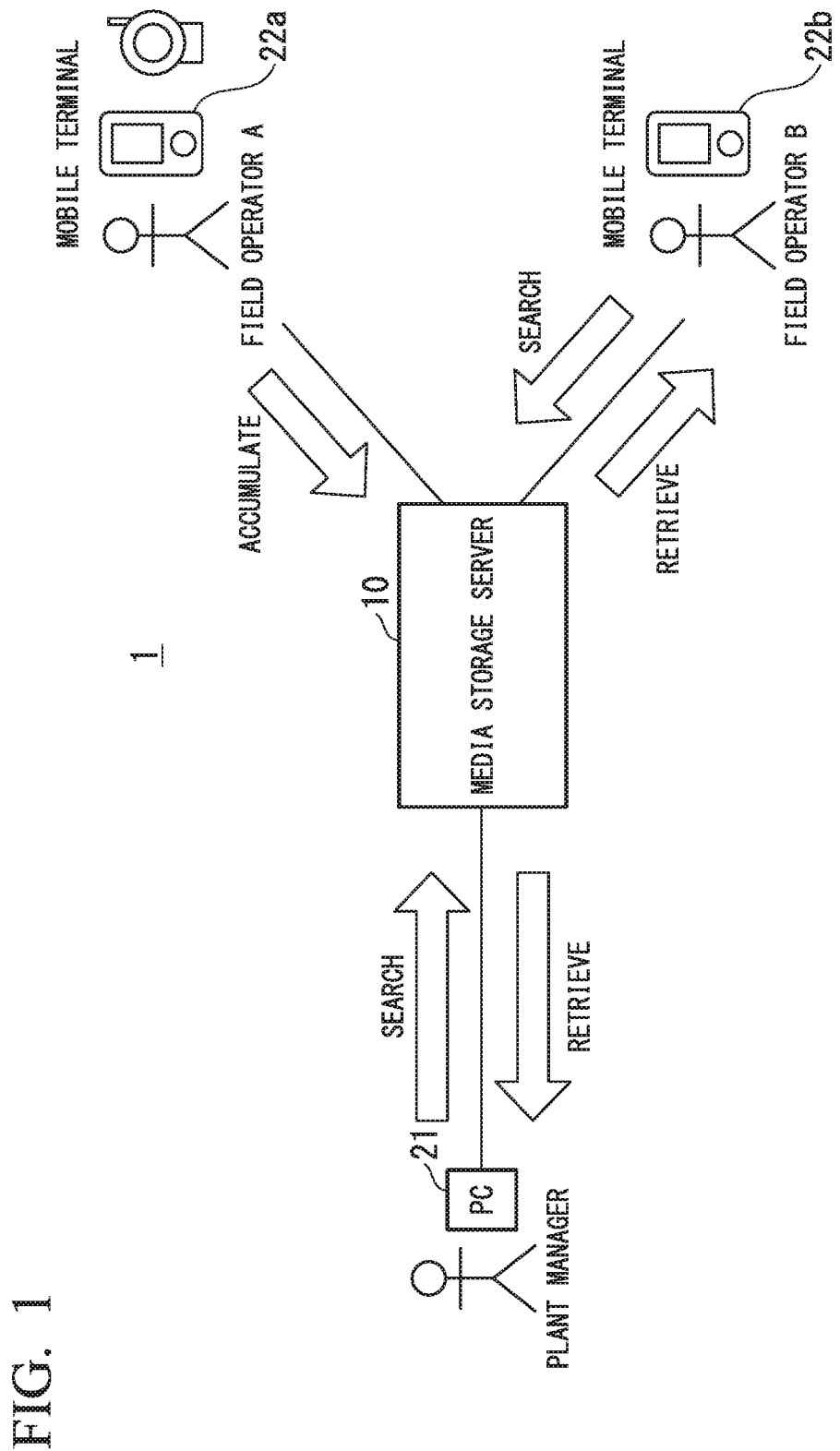
FIG. 1 is a drawing illustrating an example of operation of the maintenance information sharing system in the embodiment.

First, an outline of operation of a maintenance information sharing system will be described by using FIG. 1. FIG. 1 is a drawing illustrating an example of operation of the maintenance information sharing system in the embodiment.

In FIG. 1, the maintenance information sharing system 1 is a system for accumulating maintenance information and searching and retrieving the accumulated maintenance information. The maintenance information is information for supporting a maintenance work performed by a worker, and the maintenance information is information accumulated in a contents form, such as text, sound, and image (still image or moving image). In the present embodiment, a case where the maintenance information is accumulated in a media storage server 10 will be described. The media storage server 10 provides a function of accumulating the maintenance information received from a terminal device, a function of searching the accumulated maintenance information, and a function of retrieving the searched maintenance information. In FIG. 1, a PC (Personal Computer) 21, a mobile terminal 22a, and a mobile terminal 22b are illustrated as the terminal device. For example, the PC 21 is a desktop type PC. The mobile terminal 22a and the mobile terminal 22b are carried and operated by a field operator who performs a maintenance work in a plant. For example, the mobile terminal 22a and the mobile terminal 22b are a notebook PC, a tablet PC, a PDA (Personal Digital Assistant), a general-purpose device such as a smart phone, or a device dedicated to maintenance of devices. For example, the mobile terminal 22a and the mobile terminal 22b may include a device maintenance program for maintaining a field device, and may support a maintenance work of the field device by executing the device maintenance program.

[Accumulating Maintenance Information (Maintenance Record)]

Figure 6:
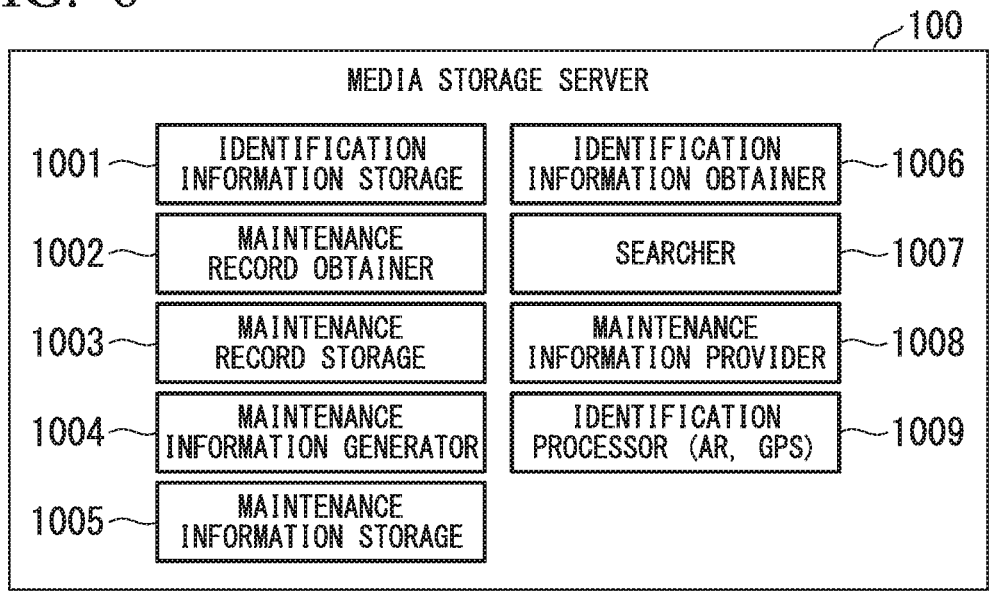
FIG. 6 is a drawing illustrating an example of the functional configuration of the media storage server in the embodiment.

In FIG. 1, a field operator A accumulates maintenance information in the media storage server 10 from an information device, such as the mobile terminal 22a held by the field operator A. For example, first, the field operator A accesses the media storage server 10 from the mobile terminal 22a, and displays a display screen for accumulating the maintenance information, which is provided by the media storage server 10, on the mobile terminal 22a. The field operator A inputs maintenance information from the displayed display screen, and transmits the maintenance information to the media storage server 10. The transmitted maintenance information is accumulated in the media storage server 10. The maintenance information described here is the same meaning as maintenance record described later in FIG. 6. In FIG. 6, it will be described that the maintenance information is generated based on the maintenance record.

A moving image and a still image which are captured by a camera of the mobile terminal 22a, voice data in which a telephone call in the mobile terminal 22a has been recorded, logs of text communication such as logs of a text chat executed in the mobile terminal 22a, process data obtained from the field device, and so on, may be included in the maintenance information transmitted to the media storage server 10. For example, when the field operator A performs a predetermined maintenance work, the field operator A obtains data from the field device, and records the data in the mobile terminal 22a. The field operator A may telephone an advanced skill worker (not illustrated) from the mobile terminal 22a, may receive instructions of the maintenance work by the telephone call, and may record the voice of the telephone call. The field operator A may receive instructions of the maintenance work in a text from the advanced skill worker by using a chat application installed in the mobile terminal 22a, and the field operator A may record a chat log. When the predetermined maintenance work is completed, the field operator A can transmit, to the media storage server 10, the recorded data of the field device, the voice of the telephone call, and the chat log. Details of the maintenance information accumulated in the media storage server 10 will be described later by using FIG. 8.

Although only the field operator A accumulates the maintenance information in FIG. 1, two or more field operators may possess a mobile terminal which can transmit the maintenance information, and may accumulate the maintenance information for every maintenance work.

The maintenance work which is to be performed may be scheduled beforehand. In this case, the media storage server 10 may accumulate the maintenance information corresponding to the maintenance work scheduled beforehand. For example, a work ID (Identification) may be assigned beforehand to the maintenance work which is to be performed, the field operator A may assign the maintenance information to the work ID, and may transmit the maintenance information. The media storage server 10 can associate the transmitted maintenance information with the work ID, and can accumulate it. The media storage server 10 may provide the mobile terminal 22a with a display screen according to the work ID in order to associate the maintenance information which is to be transmitted with the work ID, and accumulate it.

[Searching and Retrieving the Maintenance Information]

In FIG. 1, the field operator B searches the maintenance information accumulated in the media storage server 10 by using an information device, such as the mobile terminal 22b held by the field operator B. For example, the field operator B can search the maintenance work by using, as a search key, text data such as a plant name for maintenance, a process name, a facility name, a device name, a facility ID attached to a device or a facility (it may be called as "device ID"), a device tag, and a maintenance item (work item). The field operator B may transmit, to the media storage server 10, the image data taken by the camera of the mobile terminal 22b held by the field operator B as a search key. The search key transmitted from the mobile terminal 22b to the media storage server 10 may be a search formula in which two or more search keys have been combined.

The maintenance item in the present embodiment is a work item, such as a check of a parameter which has been set to the field device, a setting of the parameter to the field device, a predetermined examination, and a predetermined adjustment. Specifically, the maintenance item is such as a loop test, a zero point adjustment, a span adjustment, a tag/address/roll setting, a setting/cancellation of a setting restriction, a calibration of a valve, a squawk of the device, provisioning of ISA100, switching on-service/off-service of the device, switching service mode, a partial stroke test of the valve.

The media storage server 10 searches the maintenance information based on the transmitted search key. In a case that the search key is a text data, the media storage server 10 searches the maintenance information associated with the text data. In a case that the search key is image data, the media storage server 10 searches the maintenance information by a similar image search. The similar image search will be described later in FIG. 6.

The media storage server 10 transmits the search result of the maintenance information to the mobile terminal 22b. For example, the media storage server 10 transmits the search result to the mobile terminal 22b as a selectable list. For example, the selectable list is text information to which a hyperlink for identifying the maintenance information has been attached. The field operator B can retrieve and obtain a file and a web page of specific maintenance information by selecting one of the text information from the list of the search result. The field operator 13 can perform the maintenance work while checking the maintenance information at the field by displaying or playing the obtained maintenance information in the mobile terminal 22b.

A plant manager searches the maintenance information accumulated in the media storage server 10 by using an information device such as the PC terminal 21. Searching and retrieving the maintenance work are the same as the searching and the retrieving from the mobile terminal 22b which were described above. The plant manager can give proper instructions to a worker, such as the field operator B, based on the retrieved maintenance information.

In FIG. 1, although the case where the terminal device which accumulates the maintenance information in the media storage server 10 is one terminal (the mobile terminal 22a), and the terminal devices which searches and retrieves the maintenance information are two terminals (the mobile terminal 22b and PC 21) has been described, the number of the terminal devices is not limited thereto. For example, the mobile terminal 22a held by the field operator A may search and retrieve the maintenance information, and the mobile terminal 22b or the PC 21 may accumulate the maintenance information. Here, the explanation of the outline of the operation of the maintenance information sharing system by using FIG. 1 has been ended.

Figure 2:
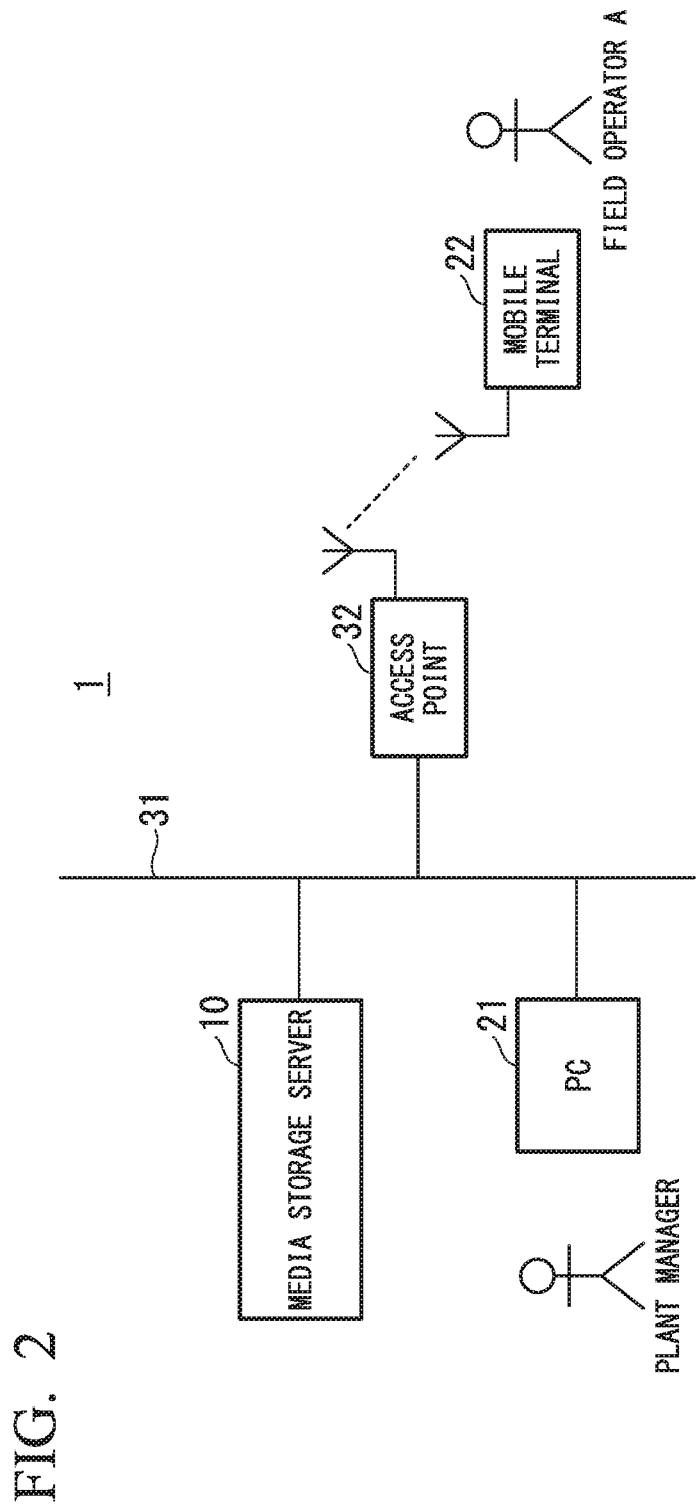
FIG. 2 is a drawing illustrating an example of the configuration of the maintenance information sharing system in the embodiment.
Figure 3:
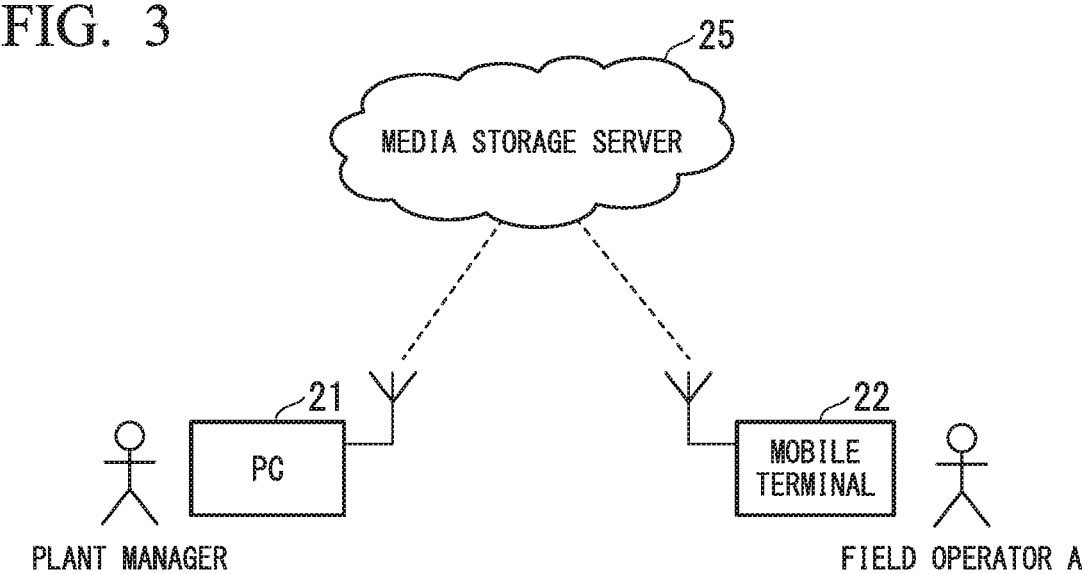
FIG. 3 is a drawing illustrating another example of the configuration of the maintenance information sharing system in the embodiment.

Next, a configuration of the maintenance information sharing system will be explained by using FIG. 2 and FIG. 3. FIG. 2 is a drawing illustrating an example of the configuration of the maintenance information sharing system in the embodiment. FIG. 3 is a drawing illustrating another example of the configuration of the maintenance information sharing system in the embodiment.

In FIG. 2, the media storage server 10 is connected to the PC 21 and the access point 32 through the network 31. For example, the network 31 may include a router, a switch, a firewall, and so on. The media storage server 10 may be connected to the PC 21 via a router.

The access point 32 is an access point of wireless LAN. The access point 32 enables two or more mobile terminals 22 which are within a predetermined range to communicate with the media storage server 10.

FIG. 3 shows a configuration for realizing the media storage server 10 by cloud computing (cloud). The cloud is a model for sharing computing resources, such as a network, a server, storage, application, and service. If the media storage server 10 is realized by the cloud, for example, availability can be improved, or costs of the system construction can be reduced. The PC 21 and the mobile terminal 22 access the media storage server 10 on the cloud by a predetermined communication means. If the media storage server 10 is realized by the cloud, for example, it becomes easy to obtain the maintenance information from a worker's terminal device in the plant in a distant place. Here, the explanation of the configuration of the maintenance information sharing system by using FIG. 2 and FIG. 3 has been ended.

Figure 4:
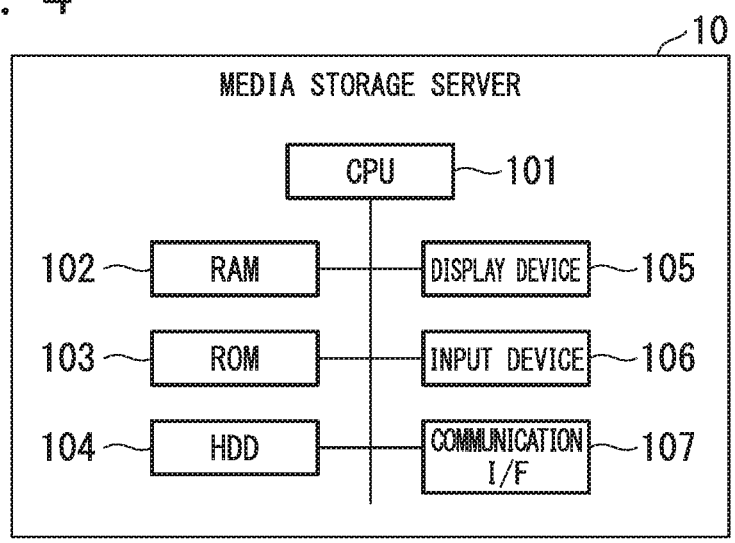
FIG. 4 is a drawing illustrating an example of the hardware configuration of the media storage server in the embodiment.

Next, a hardware configuration of the media storage server 10 will be explained by using FIG. 4. FIG. 4 is a drawing illustrating an example of the hardware configuration of the media storage server 10 in the embodiment.

In FIG. 4, the media storage server 10 has a CPU (Central Processing Unit) 101, a RAM (Random Access Memory) 102, a ROM (Read Only Memory) 103, an HDD (Hard Disk Drive) 104, a display device 105, an input device 106, and a communication I/F (Interface) 107.

The CPU 101 controls the media storage server 10 by executing the program stored in the RAM 102, the ROM 103, or the HDD 104. For example, the program executed by the CPU 101 is obtained from a non-transitory computer readable storage medium in which the program is stored, or a server which provides the program through the network. Thereafter, the program is installed in the HDD 104 and stored in the RAM 102 so that the CPU 101 can read the program. For example, the display device 105 is a liquid crystal display. For example, the input device 106 is an operation input device (a keyboard and a mouse), a device which reads information from a storage medium, or a device for inputting information such as a bar code reader. The display device 105 and the input device 106 may be realized by a touch panel.

The communication I/F 107 is an interface for communicating with other devices through a wired communication or a wireless communication, such as a network adaptor. For example, the other devices are the PC 21 and the mobile terminal 22 shown in FIG. 2. For example, the other devices may be another media storage server (not illustrated), a device for managing the maintenance information stored in the media storage server 10, a DCS (Distributed Control System) control device, an FA (Factory Automation) computer, a PLC (Programmable Logic Controller), or the like. Here, the explanation of the hardware configuration of the media storage server 10 by using FIG. 4 has been ended.

Figure 5:
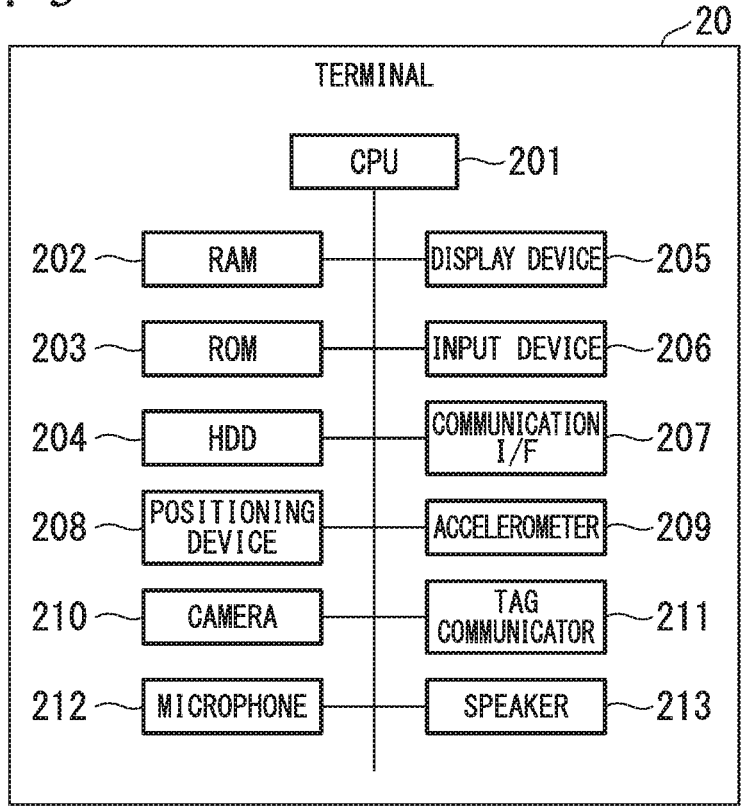
FIG. 5 is a drawing illustrating an example of the hardware configuration of the terminal device in the embodiment.

Next, a hardware configuration of the terminal device 20 will be explained by using FIG. 5. FIG. 5 is a drawing illustrating an example of the hardware configuration of the terminal device 20 in the embodiment.

In FIG. 5, the terminal device 20 has a CPU 201, a RAM 202, a ROM 203, an HDD 204, a display device 205, an input device 206, a communication I/F 207, a positioning device 208, an accelerometer 209, a camera 210, a tag communicator 211, a microphone 212, and a speaker 213. Since the CPU 201, the RAM 202, the ROM 203, the HDD 204, the display device 205, and the input device 206 is the same as the hardware configuration of the media storage server 10 shown in FIG. 4, explanation thereof will be omitted.

Like the communication I/F 107, the communication I/F 207 is an interface for communicating with other devices through a wired communication or a wireless communication, such as a network adaptor. The communication I/F 207 may communicate by using a protocol for communicating with the field device. For example, the communication I/F 207 may communicate by using ISA100 which is a wireless communication standard of ISA (International Society of Automation). The communication I/F 207 may also communicate by using a communication protocol for industrial instruments, such as HART (Highway Addressable Remote Transducer) (registered trademark), BRAIN (registered trademark), FOUNDATION Fieldbus, PROFIBUS, and so on.

The positioning device 208 measures a current position of the terminal device 20. For example, the positioning device 208 measures the current position by using GPS (Global Positioning System). The positioning device 208 may measure the current position based on a signal transmitted from a wireless station (access point) of the wireless communication. If it is difficult to catch an electric wave from the GPS satellite (for example, an indoor plant), the positioning device 208 specifies the position of the access point based on the information of the access point installed in the plant. Thereby, the positioning device 208 can guess the current position of the terminal device 20. For example, the positioning device 208 may measure a direction (an orientation, an elevation angle, or the like) of the camera 210.

The accelerometer 209 measures a posture (inclination) of the terminal device 20. A posture of the camera 210 can be specified by the posture measured by the accelerometer 209. The direction of the camera 210 can be measured by the posture of the camera 210 which measured by the accelerometer 209 and the direction of the camera 210 measured by the positioning device 208. The direction of the camera 210 is used at a time of specifying a device or a machine which is a maintenance target, which has been photographed by the camera 210 described later.

The camera 210 photographs an image (a moving image or a still image) which is to be accumulated in the media storage server 10. The data, such as the measured current position of the terminal device 20 and the measured direction of the camera 210, can be added to image data of the image photographed by the camera 210. The image data and the photographing target can be associated with each other by adding the data of the current position or the like to the image data photographed by the camera 210.

The tag communicator 211 communicates with a wireless tag for a short-distance wireless communication. The wireless tag which communicates with the tag communicator 211 is such as a RFID (Radio Frequency Identifier). For example, the wireless tag may be attached on a device which is a maintenance target. In this case, the tag communicator 211 can obtain an ID from the wireless tag, and can specify the device on which the wireless tag has been attached.

The microphone 212 collects voice to be included in the moving image captured by the camera 210. In a case that the terminal device 20 has a telephone call function, the microphone 212 may collect contents of telephone call. For example, the speaker 213 outputs voice included in the maintenance information when the terminal device 20 plays the maintenance information. Here, the explanation of the hardware configuration of the terminal device 20 by using FIG. 5 has been ended.

Next, a functional configuration of the media storage server will be explained by using FIG. 6. FIG. 6 is a drawing illustrating an example of the functional configuration of the media storage server in the embodiment. In the following explanation, the hardware configuration of the media storage server 10 shown in FIG. 4 is referred to suitably.

In FIG. 6, the media storage server 100 has functions of identification information storage 1001, a maintenance record obtainer 1002, a maintenance record storage 1003, a maintenance information generator 1004, maintenance information storage 1005, an identification information obtainer 1006, a searcher 1007, a maintenance information provider 1008, and an identification processor 1009. Each function of the media storage server 100 can be implemented by executing a program in the CPU 101 of the media storage server 10 shown in FIG. 4. That is, each function of the media storage server 100 is a functional module implemented by software.

The identification information storage 1001 stores, in the HDD 104, identification information for identifying a maintenance target. The maintenance target identified by the identification information stored by the identification information storage 1001 is such as a field device, a facility, a process, a plant, or a maintenance item. The identification information storage 1001 stores the identification information associated with the field device or the like which is a maintenance target, so that the maintenance target can be searched based on the identification information. The identification information is such as a plant name, a process name, a facility name, a device name, a facility ID or a device tag attached to a device or a facility, and a maintenance item name. The identification information may be such as date and time when the maintenance record is created (the maintenance work is performed), a worker name, and identification information of the maintenance work defined at a time of maintenance planning. The identification information is used as a search key for searching the maintenance information stored in the maintenance information storage 1005. Two or more identification information may be combined, and may be used as the search key.

For example, the identification information storage 1001 may read the identification information associated with the maintenance target out of a data file stored in a data format, such as CSV (Comma-Separated Values), and the identification information storage 1001 may store it.

The maintenance record obtainer 1002 obtains a maintenance record of the identified maintenance target. For example, the maintenance record is obtained from the mobile terminal 22a held by the worker shown in FIG. 1. For example, the maintenance record obtainer 1002 obtains the maintenance record from the maintenance target identified by the worker. If the identification information for identifying the maintenance target is included in the obtained maintenance record, the maintenance record obtainer 1002 may identify the maintenance target in accordance with the obtained maintenance record. The maintenance record obtainer 1002 may obtain the maintenance record of the identified maintenance target from the DCS control device, the FA computer, the PLC, or the like.

The maintenance record obtained by the maintenance record obtainer 1002 is such as a moving image or a still image captured by the camera of the mobile terminal 22a, voice data in which a telephone call in the mobile terminal 22a has been recorded, logs of a text chat executed in the mobile terminal 22a, process data obtained from the field device, and so on.

The maintenance record storage 1003 stores, in the HDD 104, the maintenance record associated with the identification information and obtained by the maintenance record obtainer 1002. There is a case where two or more kinds of records such as a moving image, a still image, voice data, and so on are included in the maintenance record obtained by the maintenance record obtainer 1002. Moreover, there is a case where two or more records of the same kind are included in the maintenance record. The maintenance record storage 1003 associates the obtained records with the identification information respectively, and stores it.

The maintenance information generator 1004 generates the maintenance information based on the maintenance record associated with the identification information and stored in the maintenance record storage 1003. The maintenance information generated by the maintenance information generator 1004 is stored in the maintenance information storage 1005, and is searched by the searcher 1007, and also is displayed or played by the terminal device 20. That is, the maintenance information generator 1004 generates the maintenance information as contents in a form which the terminal device 20 can display or play.

For example, the maintenance information generator 1004 generates the maintenance information by converting, into a predetermined file format, the maintenance record of the moving image, the still image, or the voice data, which have been stored in the maintenance record storage 1003. The maintenance information generator 1004 may generate the maintenance information by editing the maintenance record stored in the maintenance record storage 1003 in accordance with the terminal device 20 which displays and plays the maintenance information. For example, the maintenance information generator 1004 generates the maintenance information based on at least one of a resolution and a codec of the display device 205 in the terminal device 20. The maintenance information generator 1004 may generate the maintenance information in which two or more maintenance records stored in the maintenance record storage 1003 are gathered as one content. For example, the maintenance information generator 1004 may generate the maintenance information for displaying collectively a maintenance record of the moving image, a maintenance record of the still image, or the process data obtained from the field device. For example, the maintenance information generator 1004 may be a web server which generates a web screen for displaying the maintenance information. In the web screen for displaying the maintenance information, data of the maintenance record stored by the maintenance record storage 1003 may be linked to the maintenance information, and may be displayed. The maintenance record linked in the web screen may be changed in accordance with a predetermined condition.

The maintenance information storage 1005 stores, in the HDD 104, the maintenance information associated with the identification information and generated by the maintenance information generator 1004.

The identification information obtainer 1006 obtains the identification information transmitted from the terminal device 20 as the search key, and outputs the identification information to the searcher 1007. It is desirable that the identification information which can be used by the searcher 1007 is matched with the identification information used as the search key by the terminal device 20. For example, the identification information which can be used by the searcher 1007 can be matched with the identification information transmitted from the terminal device 20 by transmitting a list of the identification information stored in the identification information storage 1001 in accordance with a request from the terminal device 20.

The searcher 1007 searches the maintenance information stored in the maintenance information storage 1005 based on the identification information obtained by the identification information obtainer 1006. The searcher 1007 may search the maintenance information by using the identification information as the search key. The searcher 1007 searches the maintenance information which is associated with the identification information of the search key and identified. The searcher 1007 may search the maintenance information by using a search formula including the identification information. For example, in a case that the search formula is a combination of a facility ID and an inspection date, the searcher 1007 searches the maintenance information inspected on the inspection date in the field device identified by the facility ID. The searcher 1007 outputs the searched maintenance information to the maintenance information provider 1008.

The maintenance information provider 1008 provides the maintenance information searched by the searcher 1007 to the terminal device 20 which has been transmitted the identification information obtained by the identification information obtainer 1006. For example, the maintenance information provider 1008 provides the web page which includes the searched maintenance information to the terminal device 20. The maintenance information provider 1008 may transmit a file data including the searched maintenance information to the terminal device 20.

The identification processor 1009 performs AR processing. The AR processing is processing for augmenting the real world captured in the image. For example, the AR processing is processing for superimposing a virtual image on an actual image. In the AR processing, in order to superimpose the virtual image, the identification processor 1009 identifies an object captured in the actual image, adds predetermined information to the identified real object, and stores it. The identification processor 1009 superimposes the virtual image on the identified actual object, and displays it.

For example, the identification processor 1009 obtains the identification information for identifying the device which has been photographed, based on an image of an actual device photographed by the camera, information of a position (GPS data) of the camera which has captured the image, which has been obtained by the positioning device 208, information of a direction of the camera, and so on. The identification processor 1009 can obtain device information about the device, maintenance information, and production information based on the obtained identification information. The identification processor 1009 generates a virtual image of the obtained device information or the like, and superimposes the virtual image on the actual image of the identified device. An image for supporting the maintenance work may be included in the superimposed virtual image. The image for supporting the maintenance work is such as an image showing a work procedure, a circuit diagram, a connecting diagram, a parameter of the field device, or the like. The virtual image superimposed by the identification processor 1009 may be stored as the maintenance record with an actual image.

By performing the AR processing, for example, even if the worker does not input the device ID of the field device, the maintenance information can be obtained and stored only by photographing the device by the camera.

In FIG. 6, the functions of the identification information storage 1001, the maintenance record obtainer 1002, the maintenance record storage 1003, the maintenance information generator 1004, the maintenance information storage 1005, the identification information obtainer 1006, the searcher 1007, the maintenance information provider 1008, and the identification processor 1009, which have been included in the media storage server 100, are implemented by software. However, the one or more functions included in the media storage server 100 may be implemented by hardware. The functions included in the media storage server 100 may be implemented by dividing one function into two or more functions. The functions included in the media storage server 100 may be implemented by integrating two or more functions into one function. Here, the explanation of the functional configuration of the media storage server 100 by using FIG. 6 has been ended.

Figure 7:
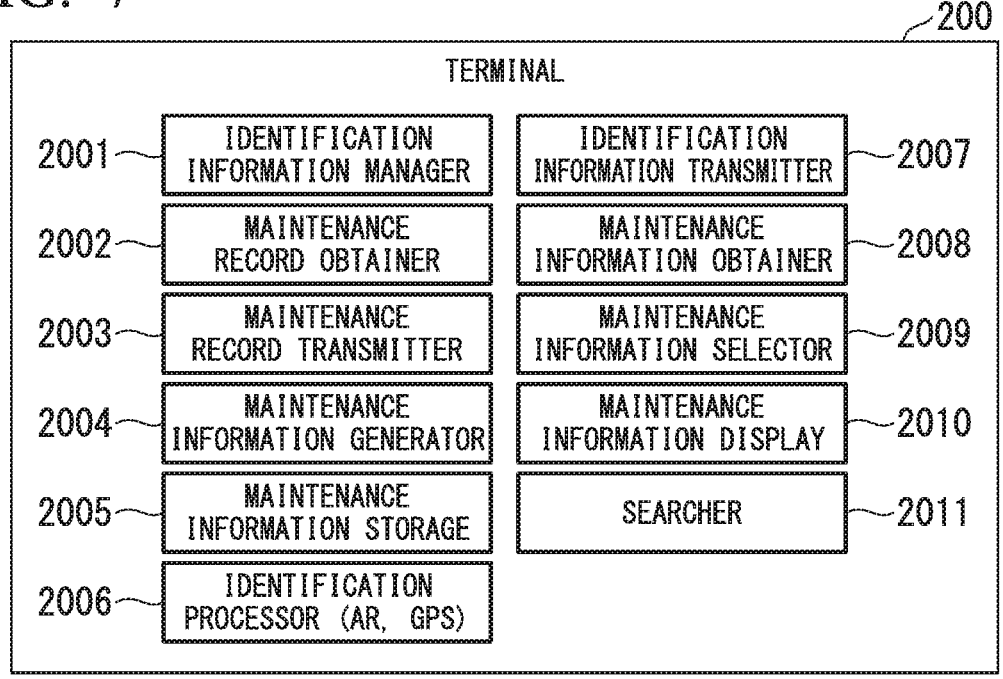
FIG. 7 is a drawing illustrating an example of the functional configuration of the terminal device in the embodiment.

Next, the functional configuration of the terminal device 200 will be explained by using FIG. 7. FIG. 7 is a drawing illustrating an example of the functional configuration of the terminal device 200 in the embodiment. In the following explanation, the hardware configuration of the terminal device 20 shown in FIG. 5 is referred to suitably.

In FIG. 7, the terminal device 200 has functions of an identification information manager 2001, a maintenance record obtainer 2002, a maintenance record transmitter 2003, a maintenance information generator 2004, a maintenance information storage 2005, an identification processor 2006, an identification information transmitter 2007, a maintenance information obtainer 2008, a maintenance information selector 2009, a maintenance information display 2010, and a searcher 2011. Each function of the terminal device 200 can be implemented by executing a program in the CPU 201 of the terminal device 200 shown in FIG. 5. That is, each function of the terminal device 200 is a functional module implemented by software.

Like the media storage server 100, the terminal device 200 shown in FIG. 7 has functions for obtaining the maintenance record of the maintenance target, associating the obtained maintenance record with the identification information for identifying the maintenance target, storing the obtained maintenance record, generating the maintenance information based on the maintenance record associated with the identification information and stored, storing the generated maintenance information, searching the stored maintenance information based on the identification information, providing the searched maintenance information, and connecting communicably with other facilities through a communication line. Thereby, the maintenance information can be shared. Since the terminal device 200 has a function for sharing the maintenance information, even if the media storage server 100 cannot be used, the maintenance information can be used. Explanation of a function of the terminal device 200 which is the same as the function of the media storage server 100 will be omitted partially.

The identification information manager 2001 manages the identification information stored in the identification information storage 1001 of the media storage server 100. For example, in a case that a new field device is installed in the plant, the identification information manager 2001 transmits information of the new field device to the media storage server 100. In a case that a field device which has been installed is exchanged, the identification information manager 2001 transmits information of the changed field device to the media storage server 100. In a case that use of the field device is stopped, the identification information manager 2001 transmits information of the field device of which use is stopped to the media storage server 100. Since the terminal device 200 manages the identification information, the identification information stored in the identification information storage 1001 can be updated easily. The identification information manager 2001 may manage identification information, such as a plant name, a process name, a facility name, and a maintenance item name.

The maintenance record obtainer 2002 obtains the maintenance record of the identified maintenance target. For example, the maintenance record obtainer 2002 obtains the maintenance information from the maintenance target identified by the worker. For example, the maintenance record obtainer 2002 obtains, as the maintenance information, an image captured by the camera 210, data of telephone call, voice data recorded by the microphone 212, logs of a text communication, process data obtained from the field device, and so on. The maintenance record obtainer 2002 can obtain the process data through the communication I/F 207 from the field device which is in conformity with a standard of ISA100, HART, BRAIN, or the like. The maintenance record obtainer 2002 stores the obtained maintenance record in the HDD 204, and outputs the maintenance record to the maintenance record transmitter 2003. In addition to storing the maintenance record obtained by the maintenance record obtainer 2002, the maintenance record obtainer 2002 may obtain maintenance record from other terminal devices.

The maintenance record transmitter 2003 transmits the maintenance record obtained by the maintenance record obtainer 2002 to the media storage server 100. For example, the maintenance record transmitter 2003 transmits the maintenance record when the maintenance record obtainer 2002 obtains the maintenance record. The maintenance record transmitter 2003 may store the obtained maintenance record temporarily, and may transmit the maintenance record in accordance with explicit instructions of the worker.

The maintenance information generator 2004 generates the maintenance information based on the maintenance record obtained by the maintenance record obtainer 2002. The function of the maintenance information generator 2004 is the same as the function of the maintenance information generator 1004. The maintenance information generator 2004 generates the maintenance information, by converting a moving image, a still image, or a voice data into a predetermined file format. The maintenance information generator 2004 generates the maintenance information in accordance with a resolution of the display device 205, a codec, and so on.

The maintenance information storage 2005 stores, in the HDD 204, the maintenance information associated with the identification information and generated by the maintenance information generator 2004.

Like the identification processor 1009, the identification processor 2006 performs the AR processing. The terminal device 200 performs the AR processing so that, for example, the virtual image for supporting the maintenance work can be displayed on the display device 205 even if the communication with the media storage server 100 cannot be performed because of communication environment. The virtual image which is to be superimposed by the identification processor 2006 may be stored as the maintenance record with the actual image photographed by the camera 210.

The identification information transmitter 2007 transmits, to the media storage server 100, the identification information as the search key for searching the maintenance information. For example, the worker who holds the terminal device 20 specifies the identification information for identifying the maintenance work, in order to obtain the maintenance information about the maintenance work to be performed from now on. For example, specification of the identification information is performed by changing, into a checked state, a check box, such as a device tag, a device address, a manufacturer, a facility ID, a device type, a test item, a parameter to be obtained, and a work item, which have been displayed on the display device 205. The identification information may be specified for each type of contents, such as text, voice, or image. The identification information obtained by the identification processor 2006 may be specified. The identification information transmitter 2007 may transmit the identification information, when the worker performs a predetermined transmission operation (for example, a transmission button is pushed).

The maintenance information obtainer 2008 obtains, from the maintenance information provider 1008, the maintenance information searched based on the identification information transmitted from the identification information transmitter 2007. The identification information transmitter 2007 and the maintenance information obtainer 2008 may be a browser which transmits the identification information or obtains the searched maintenance information by displaying the web page provided by the maintenance information provider 1008. The maintenance information obtainer 2008 may obtain file data including the searched maintenance information from the maintenance information provider 1008. The maintenance information obtainer 2008 outputs the obtained maintenance information to the maintenance information selector 2009. The maintenance information obtained by the maintenance information obtainer 2008 can include maintenance information of a maintenance item which has not been performed yet by referring to a work plan/history table of IMM which will be described later in FIG. 8, in addition to the maintenance information of the maintenance item which has been completed.

The maintenance information selector 2009 selects the maintenance information obtained by the maintenance information obtainer 2008. There is a case that the maintenance information obtained by the maintenance information obtainer 2008 includes two or more maintenance information searched by using the identification information. For example, in a case that the identification information is the facility ID, the maintenance information obtainer 2008 obtains all the maintenance information associated with the facility ID. The maintenance information selector 2009 provides a UI (User Interface) for selecting maintenance information to be displayed or played from the obtained maintenance information. The UI provided by the maintenance information selector 2009 may be provided by a browser. The maintenance information selector 2009 may select data to be displayed or played from, for example, a moving image, a still image, logs of text communication, and process data, which are included in the maintenance information.

The maintenance information display 2010 generates display data for displaying or playing, on the display device 205, the maintenance information selected by the maintenance information selector 2009. The maintenance information display 2010 displays a moving image, a still image, and so on, in a predetermined display format. The maintenance information display 2010 may output the voice data included in the maintenance information from the speaker 213.

The searcher 2011 performs, in the terminal device 200, the search of the maintenance information performed by the searcher 1007 in the media storage server 100. That is, the searcher 2011 obtains the identification information for identifying the maintenance information, and searches the maintenance information. For example, a display screen in which the identification information can be input or selected may be displayed on the display device 205, and the worker may input or select the identification information, in order to obtain the identification information. The maintenance information which is a search target may be stored in the maintenance information storage 1005 of the media storage server 100, or may be stored in the maintenance information storage 2005 of the terminal device 200. The search method in the searcher 2011 is the same as the search method in the searcher 1007.

In FIG. 7, the functions of the identification information manager 2001, the maintenance record obtainer 2002, the maintenance record transmitter 2003, the maintenance information generator 2004, the maintenance information storage 2005, the identification processor 2006, the identification information transmitter 2007, the maintenance information obtainer 2008, the maintenance information selector 2009, the maintenance information display 2010, and the searcher 2011, which have been included in the terminal device 200, are implemented by software. However, the one or more functions included in the terminal device 200 may be implemented by hardware. The functions included in the terminal device 200 may be implemented by dividing one function into two or more functions. The functions included in the terminal device 200 may be implemented by integrating two or more functions into one function. Here, the explanation of the functional configuration of the terminal device 200 by using FIG. 7 has been ended.

Next, the work plan/history table of IMM will be explained by using FIG. 8. FIG. 8 is a drawing illustrating an example of the work plan/history table of IMM in the embodiment. The IMM (Industrial Multi Media) means multimedia contents for industry. The IMM is contents, such as an image (a moving image or a still image), a text, and a voice, and the IMM can be used for work support when the worker performs operation or maintenance of the plant. In the present embodiment, the IMM is an example of the maintenance information generated by the maintenance information generator 1004.

In FIG. 8, the work plan/history table of IMM includes seven items of a facility ID, a work ID, a maintenance item, progress, a scheduled date, a performance date/time, and an IMM ID.

The items of the facility ID, the work ID, the maintenance item, and the scheduled date are input into the work plan/history table shown in FIG. 8 before the worker performs the maintenance work. The work plan/history table is referred to as a work plan list. The facility ID is an ID of a facility, which includes the device ID. A facility of which facility ID includes "F" is a flowmeter. A facility of which facility ID includes "P" is a pressure meter. A facility of which facility ID includes "T" is a thermometer. The work ID is an ID of a work performed by the worker, and one work ID is associated with each maintenance item to be performed by the worker. For example, work IDs "1" to "3" are associated with a facility of which facility ID is "F4020", and three maintenance items of "flow amount check", "vibration check", and "leakage check" are performed. The scheduled date is a scheduled date when each maintenance item is performed.

If the worker performs the maintenance item of the work plan list, the work plan/history table is updated, and "completion" is input into the item of the progress, date and time of the completion is input into the item of the performance date/time, and an IMM ID is input into the item of the IMM ID. The IMM ID is an ID of maintenance information in which maintenance records of maintenance items have been gathered. For example, FIG. 8 shows that the maintenance records of the maintenance items of which work IDs are "1" to "3" respectively are stored as maintenance information associated with the IMM ID of "0x0001". In FIG. 8, the work items of which work IDs are "1" to "5" respectively is completed, and the work item of which work ID is "6" has not been performed yet. The work plan/history table may be referred from the terminal device 200. Here, the explanation of the work plan/history table of IMM by using FIG. 8 has been ended.

Next, a contents table of IMM will be explained by using FIG. 9. FIG. 9 is a drawing illustrating an example of the contents table of IMM in the embodiment. The contents table of FIG. 9 shows recorded contents of the maintenance information in which the item of the progress is "complete" in the work plan/history table of IMM of FIG. 8.

In FIG. 9, the contents table of IMM includes items of an IMM ID, a script, file update date/time, a moving image playing position, and a file path. The item of the IMM ID is the same as that of FIG. 8. FIG. 9 shows an example that the maintenance information is stored in two IMM IDs of "0x0001" and "0x0002". Four maintenance records are stored in the IMM ID of "0x0001". The item of the script is contents of each maintenance record in a text form. The script can be referred to when searching the contents file of the IMM. For example, text data converted from voice which has been recognized may be input into the script. Moreover, a text automatically generated based on a text which has been input manually, the facility ID, and the contents may be input into the script. Date and time when the contents file of the IMM has been updated is input into the item of the file update date/time. Although the item of the performance date/time of FIG. 8 is date and time when the maintenance item is performed, the item of the file update date/time is date and time when the maintenance information (IMM contents file) is generated based on the maintenance record. The item of the moving image playing position is a position (time) where a part corresponding to the script is played in the moving image of the maintenance record. The file path shows a position in which the contents file is stored.

Although the contents table of IMM shown in FIG. 9 shows an example in which the contents file of the moving image and the still image is stored, a record contents file, such as a text and a voice, may be stored in the contents table. Moreover, a program for executing a predetermined operation may be stored in the contents table. For example, a program for inputting conditions about the maintenance interactively and providing the maintenance information may be provided. Here, the explanation of the contents table of IMM by using FIG. 9 has been ended.

Next, a record operation of the maintenance information by the terminal device 200 will be explained by using FIG. 10. FIG. 10 is a flow chart illustrating an example of the record operation of the maintenance information by the terminal device in the embodiment. The operations of the flow charts shown in FIG. 10 and FIG. 11 described later are executed by the CPU 201.

In FIG. 10, the CPU 201 displays the UI for selecting an input method of the facility ID on a display screen of the display device 205 (Step S101). In the present embodiment, a case where the facility ID is input by using the AR processing or input manually will be explained.

After performing the processing of Step S101, the CPU 201 determines whether or not the selected input method of the facility ID is an input method using the AR processing (Step S102). If the CPU 201 determines that the selected input method of the facility ID is not the input method using the AR processing (Step S102: NO), the CPU 201 displays an UI for inputting the facility ID manually on the display device 205 (Step S103). For example, the facility ID can be input by selecting a maintenance item from the work list displayed on the display device 205 based on the work plan/history table shown in FIG. 8.

On the other hand, if the CPU 201 determines that the selected input method of the facility ID is the input method using the AR processing (Step S102: YES), the CPU 201 obtains the AR information (Step S104). The AR information is information, such as an image of a facility photographed by the camera 210, GPS data of the photographing position obtained by the positioning device 208, the direction of the camera 210, and so on.

After the processing of Step S104 is performed, the CPU 201 transmits the obtained AR information to the media storage server 100, and obtains facility information from the media storage server 100 (Step S105). The media storage server 100 obtains the identification information based on the AR information, obtains the facility information based on the identification information, and transmits the facility information to the terminal device 200.

After the processing of Step S105 is performed, the CPU 201 displays the facility ID selectively based on the obtained facility information in order to be checked (S106). The facility ID is displayed selectively so that the worker can check the facility ID. Thereby, if the facility information obtained as a result of the AR processing is wrong, or if two or more facility information is searched, the input method of the facility ID can be changed into an input method of inputting the facility ID manually without using the AR processing, or can be selected a right facility ID. The worker can compare the facility ID displayed on the work list with the facility ID obtained by the AR processing.

After the processing of Step S103 or the processing of Step S106 is performed, the CPU 201 displays recording means selectively (Step S107). For example, the recording means is a form of contents recorded in the IMM file. As the recording means, one or more forms are selected out of moving image photographing, still image photographing, voice recording, voice recognition (text) recording, chat log recording, text (for example tag display) recording, and so on. For example, if the recording means is moving image photographing, a moving image photographed by using the IMM camera 210 and the microphone 212 is recorded in the IMM file. If the recording means is voice recognition (text) recording, voice is recorded by the microphone 212, the voice is converted into a text by voice recognition in order to obtain text data, and the text data is recorded in the IMM file. The converted text data may be recorded with the voice to which the voice recognition has been performed. The selection of the recording means may include, such as a selection whether adding the IMM ID to the IMM file automatically or manually, indication of the file path, input or selection of the worker's name or a work trainer's name, indication of recording means (encoding, coding), setting whether the GPS data is added or not, and so on.

After the processing of Step S107 is performed, the CPU 201 starts to record the maintenance record by using the recording means selected in Step S107 (Step S108). For example, in a case that the recording means is still image photographing, the CPU 201 starts to record the maintenance record in a state that a still image can be photographed by using the camera 210 (in a state that a shutter can be pressed). In a case that the recording means is chat log recording, the CPU 201 records the chat log after starting to record it.

After the processing of Step S108 is performed, the CPU 201 determines whether or not the maintenance record is ended (Step S109). For example, the CPU 201 can determine whether the maintenance record is ended or not in accordance with whether or not an explicit ending operation has been performed by the worker. If the CPU 201 determines that the maintenance record is not ended (Step S109: NO), the CPU 201 repeats the processing of Step S109 and waits for the end of the maintenance record. On the other hand, if the CPU 201 determines that the maintenance record is ended (Step S109: YES), the CPU 201 ends up recording the maintenance record, and transmits the recorded maintenance record to the media storage server 100 (Step S110).

The maintenance record may be automatically transmitted when the record is ended. Moreover, the maintenance record may be transmitted when an operation of transmission instruction is performed by the worker after the end of the record. The transmission of the maintenance record is performed based on the file path shown in FIG. 9. The transmission destination (for example, the file path) may be specified in the processing of selecting the recording means in Step S107, or may be specified in the transmission processing of Step S110 after the end of the record. If the work plan shown in FIG. 8 is created beforehand, the transmission destination can be set based on the work plan beforehand. The maintenance record is transmitted after recording the maintenance record is completed and the terminal device 200 establishes the communication with the media storage server 100. However, in a case that the terminal device 200 keeps the communication with the media storage server 100 while recording the maintenance record, for example, the CPU 201 may transmit the maintenance record which is being recorded by streaming.

In FIG. 10, the facility ID is input by using the AR processing or input manually, but the input method of the facility ID is not limited thereto. For example, the facility ID may be input by being selected out of registered facility IDs by using a pull down menu, a radio button, a check box, or the like. Moreover, a free keyword search may be performed in order to select the facility ID out of the search results. Here, the explanation of the record operation of the maintenance information by the terminal device 200 by using FIG. 10 has been ended.

Next, a use operation of the maintenance information by the terminal device 200 will be explained by using FIG. 11.

Figure 11:
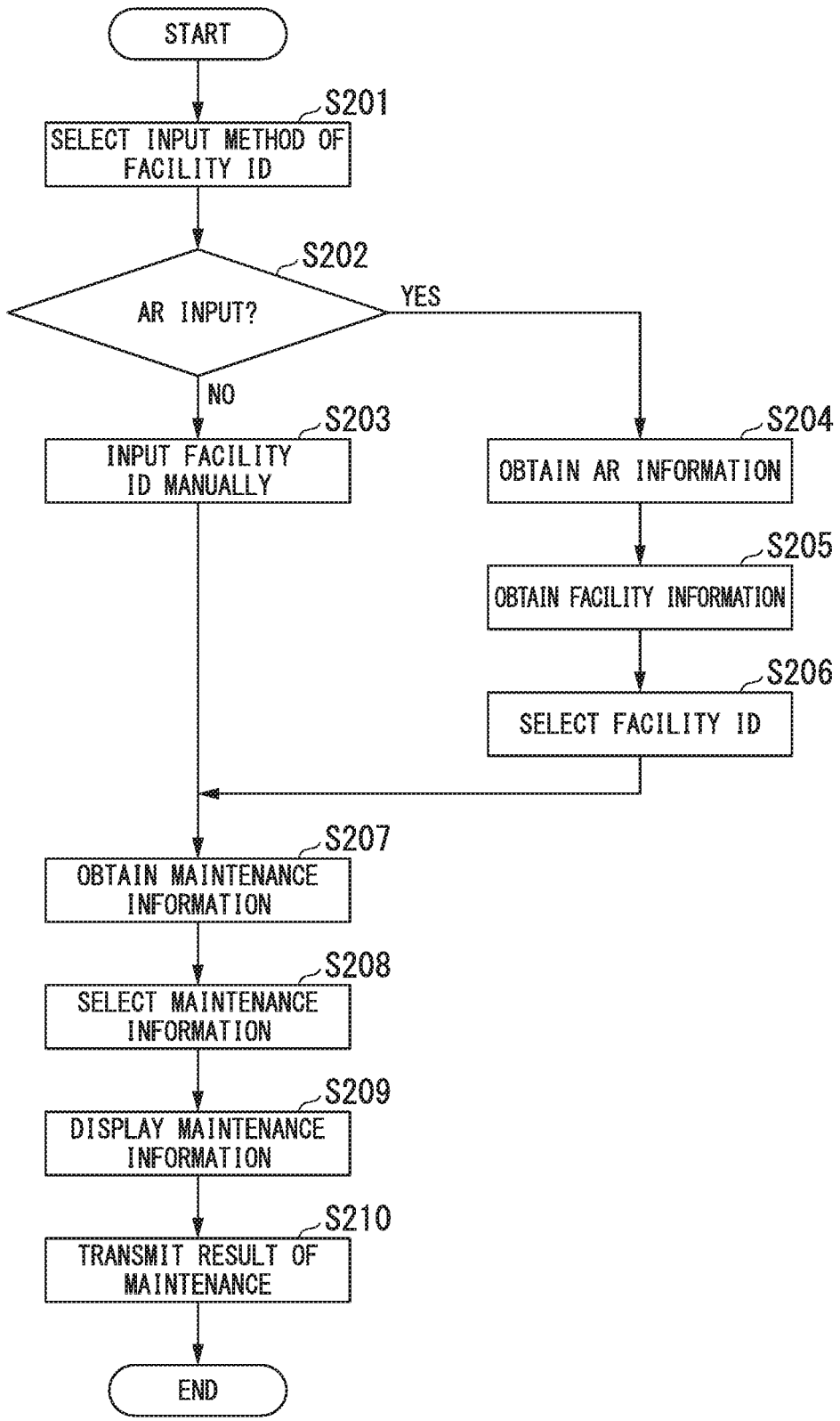
FIG. 11 is a flow chart illustrating an example of the use operation of the maintenance information by the terminal device in the embodiment.

FIG. 11 is a flow chart illustrating an example of the use operation of the maintenance information by the terminal device 200 in the embodiment.

In FIG. 11, since the processing of Step S201 to the processing of Step S206 are the same as the processing of Step S101 to the processing of Step S106 in FIG. 10, explanation thereof will be omitted. That is, also in the use operation of the maintenance information by the terminal device 200, the facility ID is input like the record operation.

After the processing of Step S203 or the processing of Step S206 is performed, the CPU 201 obtains the maintenance information stored in the media storage server 100 based on the facility ID which has been input (Step S207). As explained in FIG. 8, the IMM ID is associated with the facility ID and stored. The media storage server 100 obtains the facility ID so that media storage server 100 can search the maintenance information associated with the facility ID from the maintenance information storage 1005, and can provide the terminal device 200 with the maintenance information. The maintenance information may be obtained from the maintenance information storage 2005 in the terminal device 200.

After the processing of Step S207 is performed, the CPU 201 displays the obtained maintenance information so that the maintenance information to be played can be selected (Step S208). In the display of the maintenance information, additional information which can be referred to when selecting the maintenance information may be displayed. The additional information is such as a maintenance item, a performance date/time of the maintenance work, and so on.

After the processing of Step S208 is performed, the CPU 201 displays or plays the selected maintenance information (Step S209). The worker can receive a support of the maintenance work by checking the maintenance information displayed or played.

After the processing of Step S209 is performed, the CPU 201 transmits a maintenance result (Step S210). The worker, who has performed the maintenance work while checking the maintenance information, transmits the maintenance result to the media storage server 100, and the progress shown in FIG. 8 is changed into "complete". Recording the maintenance information explained in FIG. 10 and using the maintenance information explained in FIG. 11 may be performed at the same time. Here, the explanation of the use operation of the maintenance information by the terminal device 200 by using FIG. 11 has been ended.

Figure 12:
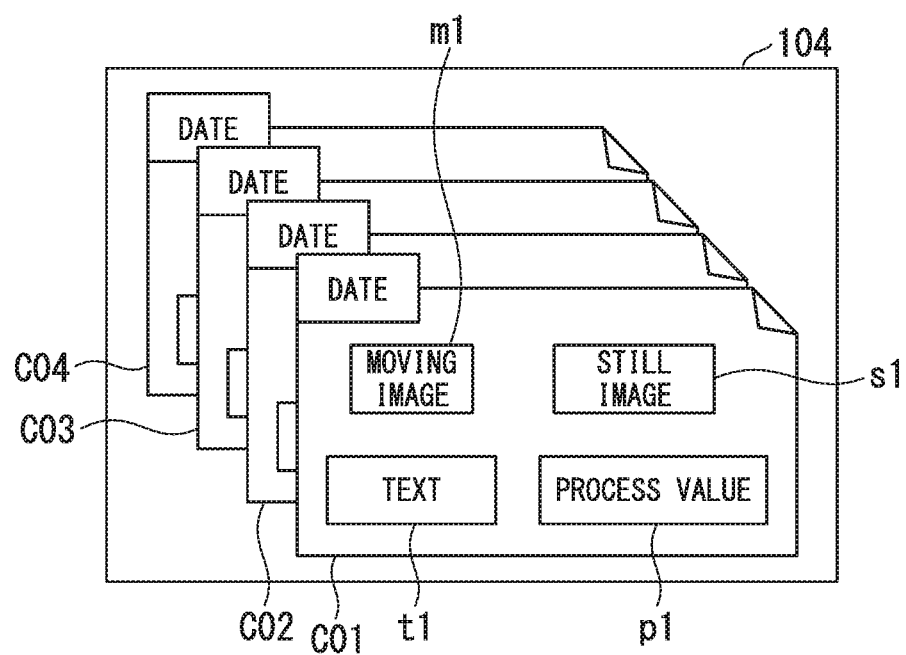
FIG. 12 is a drawing illustrating an example of the configuration of the IMM in the embodiment.

Next, a configuration of the IMM will be explained by using FIG. 12. FIG. 12 is a drawing illustrating an example of the configuration of the IMM in the embodiment.

In FIG. 12, the IMM 104 includes contents C01, contents C02, contents C03, and contents C04. The contents C01 to the contents C04 are maintenance information each of which has been generated by the maintenance information generator 1004. That is, the contents C01 to the contents C04 are search targets to be searched by using the identification information.

The contents C01 include a moving image m1, a still image s1, a text t1, and a process value (process data) p1. The text t1 is text data to which converted from voice, text data such as a work diary or a repair record, or text data of a chat log. The date when the IMM 104 was generated is given to the contents C01 to the contents C04 respectively. The moving image m1, the still image s1, the text t1, and the process value p1, which are included in the contents C01, are associated with each other. For example, the moving image m1, the still image s1, the text t1, and the process value p1 may be associated with an order of playing or displaying, a timing (time) of playing or displaying, a position of playing or displaying on the display device 205, and so on. For example, the maintenance information display 2010 can play and display one or more information out of the moving image m1, the still image s1, the text t1, and the process value p1, which are included in the contents C01. Since the IMM 104 can provide information which cannot be expressed by single information, such as a moving image and a still image, it is suitable as contents for supporting operation or maintenance of the plant. For example, the IMM 104 displays the moving image in which the maintenance work performed by an advanced skill worker has been photographed, and displays the process value at that time. Thereby, more detailed maintenance technology can be shared.

In FIG. 12, the information of the moving image m1, the still image s1, the text t1, and the process value p1 is collected in the contents C01. However, the information of the moving image m1, the still image s1, the text t1, and the process value p1 does not need to be collected as the contents C01. For example, the contents C01 may be associated and provided as the maintenance information, as a search result of the searcher 1007. For example, the information included in the contents C01 may also include information which is different at every search.

Each of the contents C01 to the contents C04 may be independent maintenance information, and may be maintenance information related to each other. For example, in a case that the contents C01 and the contents C02 are the maintenance information related to each other, the contents C02 may be displayed or played automatically after the display or the play of the contents C01 has been completed. Here, the explanation of the configuration of the IMM by using FIG. 12 has been ended.

Figure 13:
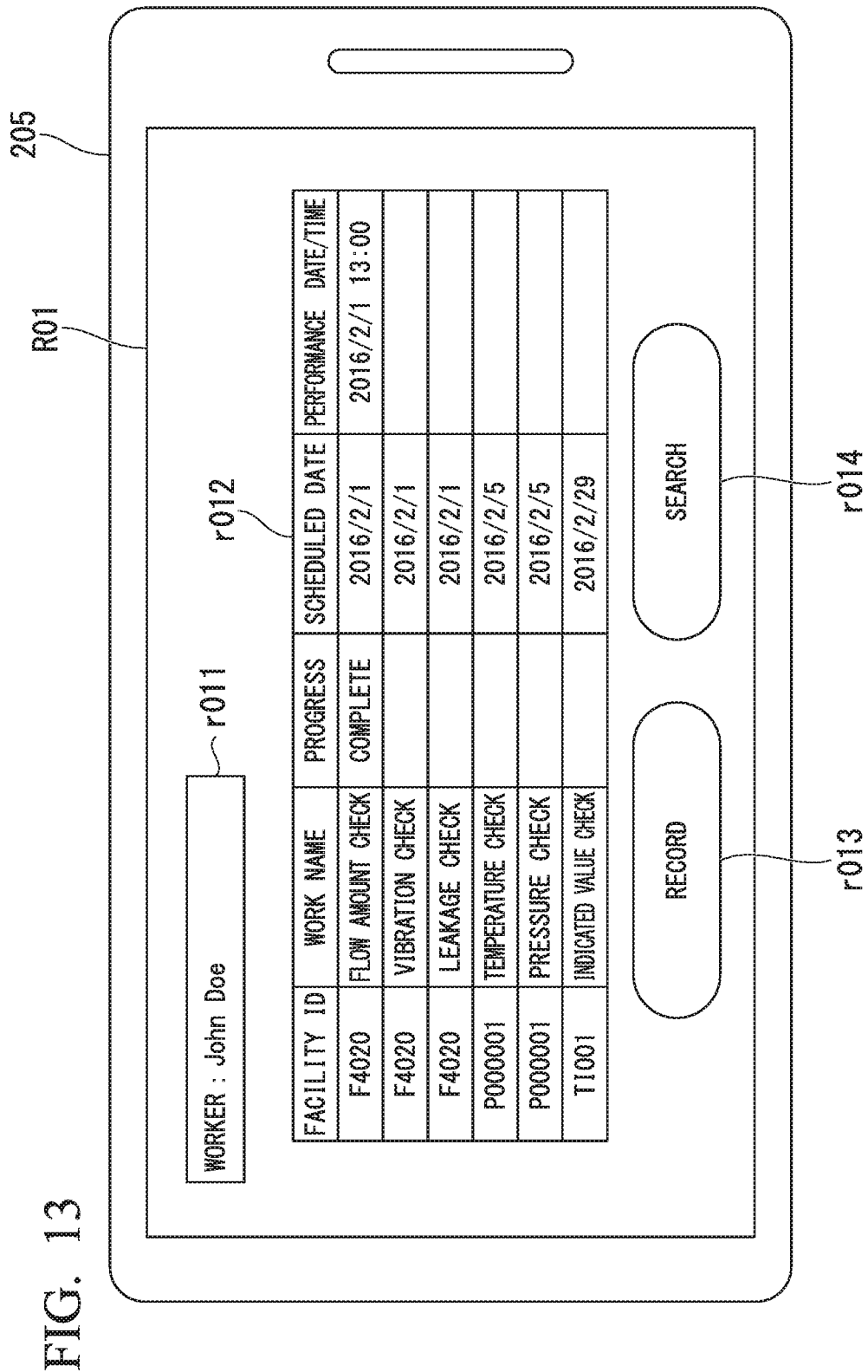
FIG. 13 is a drawing illustrating an example of the list screen of the maintenance information displayed on the display device in the embodiment.

Next, a list screen of the maintenance information displayed on the display device 205 of the terminal device 20 will be explained by using FIG. 13. FIG. 13 is a drawing illustrating an example of the list screen of the maintenance information displayed on the display device 205 in the embodiment.

In FIG. 13, the list screen R01 of the maintenance information is displayed on the display device 205. For example, in processing of Step S103 shown in FIG. 10, the list screen R01 is displayed when selecting the facility ID and recording the maintenance record. The worker name r011 is a text box in which a worker name is to be input. The worker name which has been input may be recorded with the maintenance record as supplementary information. The work list r012 is displayed based on the work plan/history table of IMM shown in FIG. 8. FIG. 13 shows that the progress is "complete", and the performance date/time is "2016/2/1 13:00", in the maintenance item of which facility ID is "F4020" and of which work name is "flow amount check". Moreover, FIG. 13 shows that any maintenance work is not performed to the other work items. The worker can grasp a maintenance item (work name) which has been completed and a maintenance item which has not been completed by viewing the work list r012.

The record r013 is an execution instruction (button) for displaying the record screen of the maintenance information described later in FIG. 14. The worker can change the display screen to the record screen by selecting the record r013 displayed on the display device 205 with a mouse. For example, if the worker records the maintenance record of which "vibration check" is "F4020", the worker selects the record r013 in a state that a line including "vibration check" of the work list r012 has been selected. By displaying the work list r012 and the record r013, the worker can grasp the maintenance item which has not been completed with reference to the work list r012, can select a maintenance item to be recorded, and can select the record r013.

The search r014 is an execution instruction (button) for displaying a search screen of the maintenance information described later in FIG. 15. The worker can change the display screen to the search screen by selecting the search r014 displayed on the display device 205 with a mouse. Here, the explanation of the list screen of the maintenance information displayed on the display device 205 by using FIG. 13 has been ended.

Next, the record screen of the maintenance information displayed on the display device 205 when the worker selects the record r013 will be described by using FIG. 14. FIG. 14 is a drawing illustrating an example of the record screen of the maintenance information displayed on the terminal device in the embodiment.

Figure 14:
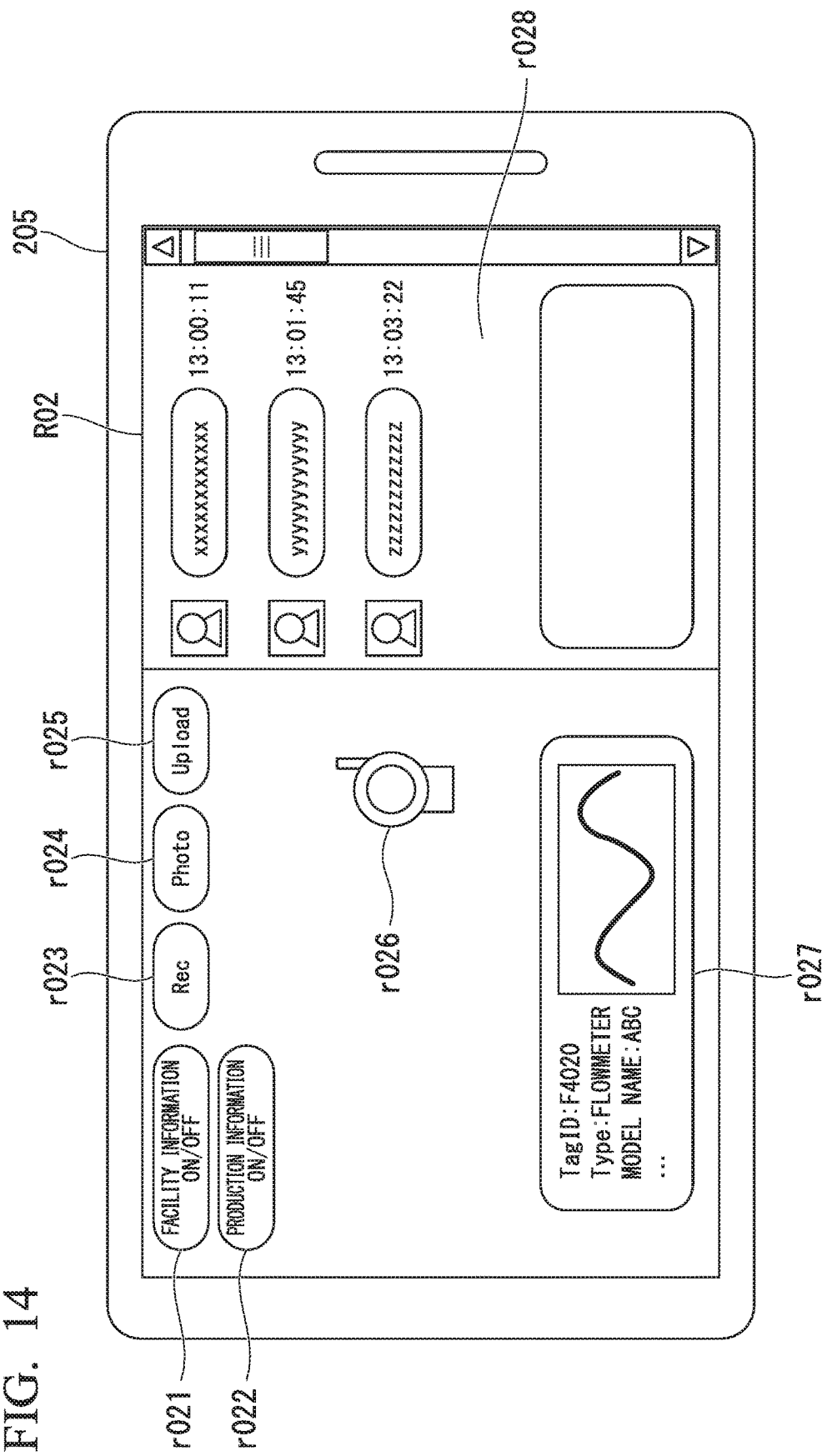
FIG. 14 is a drawing illustrating an example of the record screen of the maintenance information displayed on the terminal device in the embodiment.

In FIG. 14, the record screen R02 of the maintenance information is displayed on the display device 205. The record screen R02 has a facility information ON/OFF button r021, a production information ON/OFF button r022, a Rec button r023, a Photo button r024, an Upload button r025, a device icon r026, facility information r027, and a chat log r028.

The record screen R02 is a screen for recording the maintenance work of the maintenance item selected from the work list r012 in FIG. 13 by the worker.

The facility information ON/OFF button r021 is a button for switching ON/OFF of displaying the facility information. In FIG. 14, the device icon r026 and the facility information r027 show an example of displaying the facility information displayed when the facility information ON/OFF button r021 is ON. An operational condition of the facility, a maintenance manual of the facility, or the like, may be included in the facility information. By displaying the facility information, the maintenance work can be supported.

The production information ON/OFF button r022 is a button for switching ON/OFF of displaying the production information. FIG. 14 shows an example that the production information is not displayed when the production information ON/OFF button r022 is OFF. The production information is information, such as a production planning, a production result, a production rate, and an extraction rate, of the product obtained from the DCS. The maintenance work can be supported by displaying production information.

The Rec button r023 is a button for starting to record the moving image. After starting to record the moving image, the Rec button r023 may be changed into a button for ending up recording the moving image. The Photo button r024 is a button for recording the still image. The Upload button r025 is a button for transmitting the recorded maintenance record to the media storage server 100.

The device icon r026 is an icon showing an appearance of a facility which is a maintenance target. The worker can check the maintenance target by comparing the device icon r026 with an actual facility. The facility information r027 displays detailed information of the facility which is the maintenance target. For example, a tag ID, a type, and a model name are included in the facility information r027. A measurement result measured by the facility is displayed in the facility information r027 with a graph. The measurement result displayed on the facility information r027 may be recorded as the maintenance record. For example, the measurement result may be recorded by selecting the graph of the facility information r027 and pressing the Rec button r023.

The chat log r028 is a chat log of which maintenance work is being performed. A text is input in the text box in the lower part of the chat log r028 in order to transmit the chat. The chat log r028 may be recorded as the maintenance record by pressing the Rec button r023.

Although the record screen R02 is a screen for recording the maintenance work of the selected maintenance item, the record screen R02 may be a different display mode for each maintenance item. For example, only a button for starting to record the contents which should be recorded as the IMM file may be displayed. For example, in a case that only the moving image is recorded as the contents, the Rec button r023 may be displayed, and the Photo button r024 may not be displayed. In a case that two maintenance items of the same facility ID are recorded, a second maintenance item may be recorded directly after recording a first maintenance item without returning to the display of the work list r012 shown in FIG. 13. Here, the explanation of the record screen of the maintenance information by using FIG. 14 has been ended.

Next, the search screen of the maintenance information displayed on the display device 205 of the terminal device 20 when the worker selects the search r014 shown in FIG. 13 will be described by using FIG. 15. FIG. 15 is a drawing illustrating an example of the search screen of the maintenance information displayed on the terminal device in the embodiment.

Figure 15:
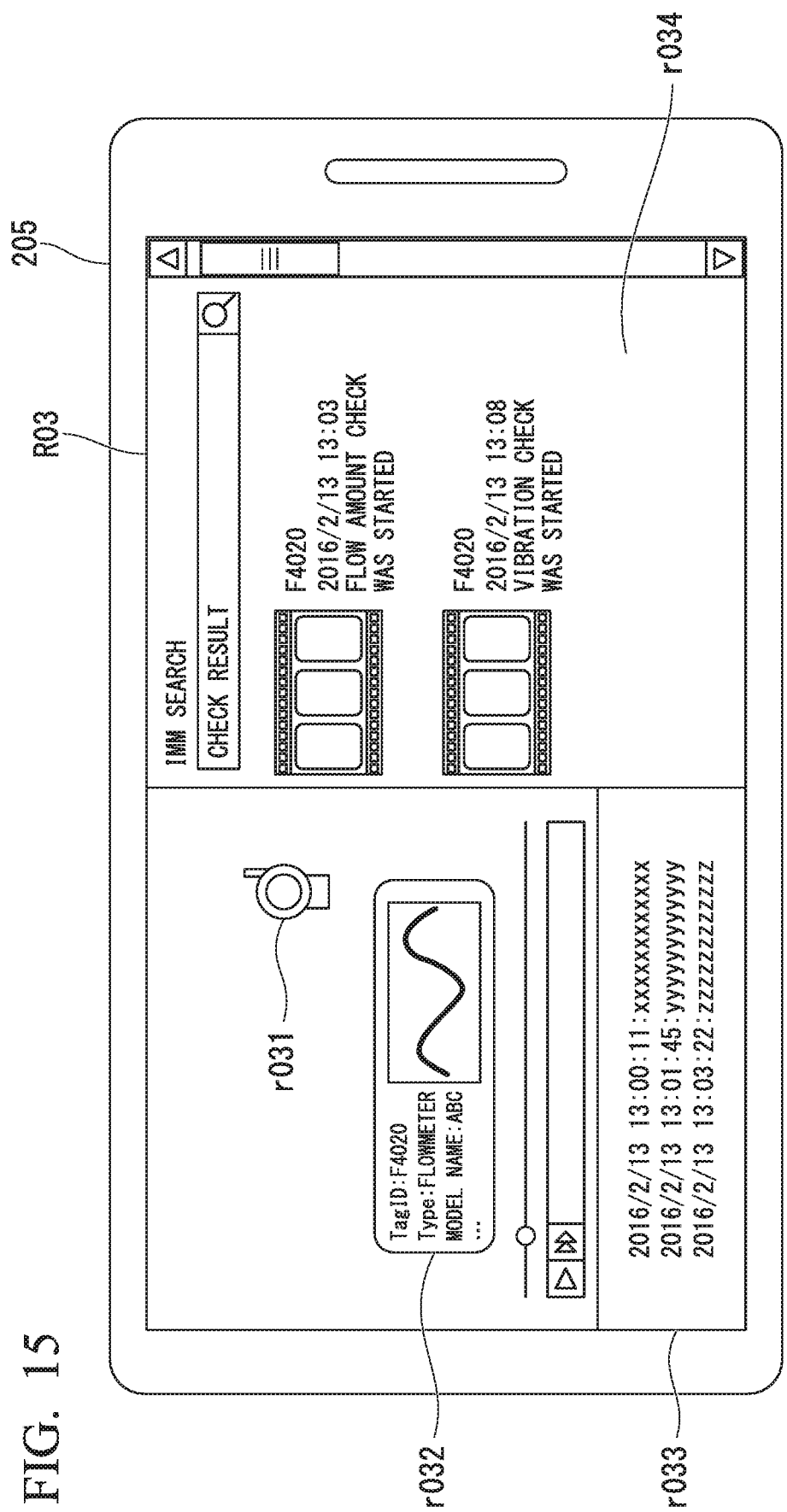
FIG. 15 is a drawing illustrating an example of the search screen of the maintenance information displayed on the terminal device in the embodiment.

In FIG. 15, the search screen R03 of the maintenance information is displayed on the display device 205. The search screen R03 has a device icon r031, facility information r032, a chat log r033, and a moving image record r034. A search result of the maintenance record which has been searched with the facility ID "F4020" is displayed in the search screen R03 shown in FIG. 15. For example, the search of the maintenance record can be performed from the search screen which is not illustrated. For example, the search of the maintenance record can be performed by using a facility ID identified in the AR processing, a type of the facility, a device name, a record date/time, a maintenance work name, a free keyword, and so on.

In the search screen R03, the device icon r031, the facility information r032, and the chat log r033 are respectively the same as the device icon r026, the facility information r027, and the chat log r028 which are shown in FIG. 14. When the worker selects each of the device icon r031, the facility information r032, and the chat log r033 with a mouse, the details of the recorded contents may be displayed. For example, when the worker selects the facility information r032, the details of the measurement data may be displayed. When the worker selects the chat log r033, all the recorded chats may be displayed.

The moving image record r034 displays a list of the recorded moving image files. In FIG. 15, two moving image files are displayed with supplementary information of a facility ID, a record date/time, and a title. A text box for searching the supplementary information is arranged at the upper part of the moving image record r034. If the worker selects a file with a mouse, the recorded moving image contents is displayed.

The maintenance work can be supported by selectively displaying the maintenance information recorded in the search screen R03. Here, the explanation of the search screen of the maintenance information displayed on the display device 205 by using FIG. 15 has been ended.

Figure 16:
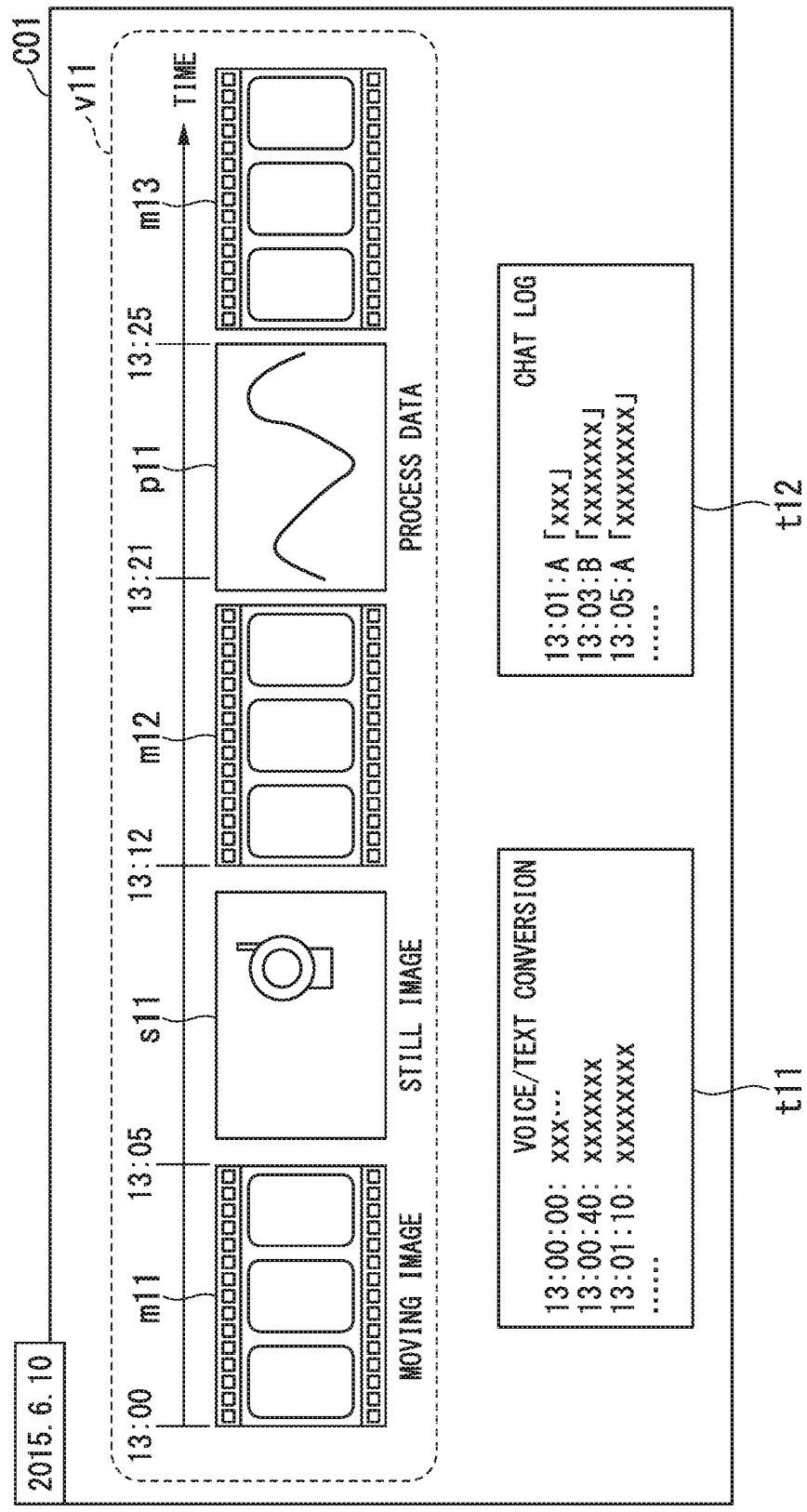
FIG. 16 is a drawing illustrating an example of the display and the play of IMM in the embodiment.

Next, a display and a play of IMM will be explained by using FIG. 16. FIG. 16 is a drawing illustrating an example of the display and the play of IMM in the embodiment.

In FIG. 16, the contents C01 show information to be played or displayed with progress of time. The v11 shows a video image displayed with progress of time. For example, the video image is displayed on a whole surface or a part of the display device 205. In addition, "2015.6.10" is a date when the contents C01 were generated, and "13:00", "13:05", or the like is a time when each of the information was generated.

A moving image m11 is played from 13:00 to 13:05. A text t11 is started to be displayed while the moving image m11 is played. The text t11 is text data which has been converted from voice. The contents can be understood easily by playing the moving image m11 and displaying the text al.

After the play of the moving image m11 is ended at 13:05, a still image s11 is displayed before a moving image m12 is started to be played at 13:12. The worker can perform the maintenance work after playing the moving image m11 has been completed. For example, the still image s11 may be a work instruction manual in which items which should be performed by the worker are described.

Playing the moving image m12 is automatically started at 13:12. For example, 13:12 is time expected that the work corresponding to the moving image m11 is completed. However, the time when the moving image m12 is played may be determined by an explicit operation performed by the worker.

Displaying the text t11 is ended and displaying the text t12 is started while the moving image m12 is played. The text t12 is text data of a chat log. The contents can be understood easily by displaying the chat log with the moving image m12.

Playing the moving image m12 is ended before 13:21, and displaying the process data p11 is started. The process data may be a graph showing time transition of a process value, a numerical value showing a current value of the process value, or the like. For example, the worker can perform the maintenance work while checking the process data p11 and the text t12, after playing the moving image m12 is ended.

In FIG. 16, the information displayed or played with progress of time is changed in the contents C01 displayed or played in the IMM 104, but the method of displaying or playing the IMM 104 is not limited thereto. For example, the information such as the moving image and the still image may be displayed or played on a display area which is a divided area of the display device 205. The worker may change manually the contents which is played or displayed in accordance with progress of the work. Here, the explanation about the display and the play of IMM by using FIG. 16 has been ended.

As described above, the maintenance information sharing device, the maintenance information sharing method, and the non-transitory computer readable storage medium obtains a maintenance record of a maintenance target, associates the obtained maintenance record with identification information for identifying the maintenance target, stores the maintenance record, generates maintenance information based on the maintenance record associated with the identification information and stored, stores the generated maintenance information, searches the stored maintenance information based on the identification information, and provides the searched maintenance information. Thereby, the maintenance information can be shared.

For example, one or more programs for implementing the functions of the device described in the present embodiment may be stored in a non-transitory computer readable storage medium, and the one or more programs stored in the non-transitory computer readable storage medium may be read and executed by a computer system to perform the above-described various kinds of processes of the present embodiments. The "computer system" may include hardware, such as an OS and a peripheral device. If the "computer system" uses a WWW system, the "computer system" also includes a homepage providing environment (or a displaying environment). The "non-transitory computer readable storage medium" is a storage device, such as a flexible disk, a magneto-optical disk, a ROM, a writable nonvolatile memory such as a flash memory, a portable medium such as a CD-ROM, and a hard disk drive built in the computer system.

Furthermore, similar to a volatile memory (for example, DRAM (Dynamic Random Access Memory)) in the computer system used as a server or a client when the program is transmitted through a network such as the Internet or a communication line such as a telephone line, the "non-transitory computer readable storage medium" includes a memory holding the program for a predetermined period. The program may be transmitted from the computer system storing the program in a storage device to another computer system, through a transmission medium or by a transmission wave in the transmission medium. Here, the "transmission medium" which transmits the program is a medium which has a function of transmitting information, similar to a network (communication network) such as the Internet, and a communication line such as a telephone line. The program may be for implementing a part of the function described above. Furthermore, the function described above may be implemented in combination with a program which has already stored in the computer system, or may be a so-called patch file (differential program).

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A maintenance information sharing device comprising:
    a maintenance record obtainer configured to obtain a maintenance record of a maintenance target and process data of a field device installed in a plant, the maintenance record being at least one of a moving image, a still image, and voice data of the maintenance target to which a maintenance work has been performed;
    a maintenance record storage configured to associate the maintenance record and the process data obtained by the maintenance record obtainer with identification information for identifying the maintenance target, the identification information including at least one of date and time, a worker's name, and identification information of the maintenance work defined at a time of maintenance planning, the maintenance record storage storing the maintenance record associated with the identification information;
    a maintenance information generator configured to generate maintenance information based on the maintenance record and the process data associated with the identification information and stored by the maintenance record storage;
    a maintenance information storage which stores the maintenance information generated by the maintenance information generator;
    a searcher configured to search the maintenance information stored by the maintenance information storage based on the identification information; and
    a maintenance information provider configured to provide the maintenance information searched by the searcher,
    wherein the maintenance information generator is configured to generate the maintenance information for displaying collectively the process data of the field device and the maintenance record which is at least one of the moving image, the still image, and text data converted from the voice data of the maintenance target,
    wherein the maintenance information sharing device further comprises an identification processor configured to:
        obtain the identification information based on an actual image of the maintenance target photographed by a camera, a position of the camera, and a direction of the camera; and
        superimpose a virtual image according to the identification information on the actual image of the maintenance target, the virtual image including an image for supporting the maintenance work,
    wherein the image for supporting the maintenance work is an image showing a work procedure, a circuit diagram, a connecting diagram, or a parameter of the maintenance target, and
    wherein the maintenance record storage is configured to store the virtual image superimposed by the identification processor as the maintenance record with the actual image of the maintenance target photographed by the camera.

2. The maintenance information sharing device according to claim 1, further comprising:
    a communicator which is communicably connectable to another device through a communication line; and
    an identification information obtainer configured to obtain the identification information from the other device which has been connected to the communicator,
    wherein the searcher is configured to search the maintenance information stored by the maintenance information storage based on the identification information obtained by the identification information obtainer, and wherein the maintenance information provider is configured to provide the maintenance information searched by the searcher to the other device.

3. The maintenance information sharing device according to claim 2,
wherein the maintenance record obtainer is configured to obtain the maintenance record from the other device which has been connected to the communicator.

4. The maintenance information sharing device according to claim 2,
wherein the maintenance information generator is configured to generate the maintenance information as contents in a form which the other device can display or play.

5. The maintenance information sharing device according to claim 2,
wherein the maintenance information generator is configured to generate the maintenance information based on at least one of a resolution and a codec of the other device.

6. The maintenance information sharing device according to claim 1,
wherein the maintenance information generator is a web server which generates a web screen for displaying the maintenance information, and
wherein data of the maintenance record stored by the maintenance record storage is linked to the maintenance information and displayed in the web screen.

7. The maintenance information sharing device according to claim 1,
wherein the maintenance information generator is configured to generate the maintenance information which includes one or more maintenance records out of a maintenance record of a moving image, a maintenance record of a still image, a maintenance record which has been converted from voice into text, and a maintenance record of logs of a text communication.

8. A maintenance information sharing method comprising:
obtaining a maintenance record of a maintenance target and process data of a field device installed in a plant, the maintenance record being at least one of a moving image, a still image, and voice data of the maintenance target to which a maintenance work has been performed;
associating the maintenance record and the process data obtained by the maintenance record obtainer with identification information for identifying the maintenance target, the identification information including at least one of date and time, a worker's name, and identification information of the maintenance work defined at a time of maintenance planning;
storing the maintenance record associated with the identification information;
generating maintenance information based on the maintenance record and the process data associated with the identification information and stored;
storing the maintenance information which has been generated;
searching the maintenance information which has been stored based on the identification information;
providing the maintenance information which has been searched;
generating the maintenance information for displaying collectively the process data of the field device and the maintenance record which is at least one of the moving image, the still image, and text data converted from the voice data of the maintenance target;
obtaining the identification information based on an actual image of the maintenance target photographed by a camera, a position of the camera, and a direction of the camera; and
superimposing a virtual image according to the identification information on the actual image of the maintenance target, the virtual image including an image for supporting the maintenance work,
wherein the image for supporting the maintenance work is an image showing a work procedure, a circuit diagram, a connecting diagram, or a parameter of the maintenance target, and
wherein the virtual image superimposed with the actual image of the maintenance target photographed by the camera is stored as the maintenance record.

9. The maintenance information sharing method according to claim 8, further comprising:
obtaining the identification information from another device through a communication line;
searching the maintenance information which has been stored based on the identification information which has been obtained; and
providing the maintenance information which has been searched to the other device.

10. The maintenance information sharing method according to claim 9, further comprising:
obtaining the maintenance record from the other device.

11. The maintenance information sharing method according to claim 9, further comprising:
generating the maintenance information as contents in a form which the other device can display or play.

12. The maintenance information sharing method according to claim 9, further comprising:
generating the maintenance information based on at least one of a resolution and a codec of the other device.

13. The maintenance information sharing method according to claim 8, further comprising:
generating a web screen for displaying the maintenance information; and
linking data of the maintenance record to the maintenance information, and displaying the data of the maintenance record in the web screen.

14. The maintenance information sharing method according to claim 8, further comprising:
generating the maintenance information which includes one or more maintenance records out of a maintenance record of a moving image, a maintenance record of a still image, a maintenance record which has been converted from voice into text, and a maintenance record of logs of a text communication.

15. A non-transitory computer readable storage medium storing one or more programs configured for execution by a computer, the one or more programs comprising instructions for:
obtaining a maintenance record of a maintenance target and process data of a field device installed in a plant, the maintenance record being at least one of a moving image, a still image, and voice data of the maintenance target to which a maintenance work has been performed;
associating the maintenance record and the process data obtained by the maintenance record obtainer with identification information for identifying the maintenance target, the identification information including at least one of date and time, a worker's name, and identification information of the maintenance work defined at a time of maintenance planning;

storing the maintenance record associated with the identification information;

generating maintenance information based on the maintenance record and the process data associated with the identification information and stored;

storing the maintenance information which has been generated;

searching the maintenance information which has been stored based on the identification information;

providing the maintenance information which has been searched;

generating the maintenance information for displaying collectively the process data of the field device and the maintenance record which is at least one of the moving image, the still image, and text data converted from the voice data of the maintenance target;

obtaining the identification information based on an actual image of the maintenance target photographed by a camera, a position of the camera, and a direction of the camera; and superimposing a virtual image according to the identification information on the actual image of the maintenance target, the virtual image including an image for supporting the maintenance work, wherein the image for supporting the maintenance work is an image showing a work procedure, a circuit diagram, a connecting diagram, or a parameter of the maintenance target, and wherein the virtual image superimposed with the actual image of the maintenance target photographed by the camera is stored as the maintenance record.

16. The non-transitory computer readable storage medium according to claim 15, the one or more programs further comprising instructions for:

obtaining the identification information from another device through a communication line;

searching the maintenance information which has been stored based on the identification information which has been obtained; and providing the maintenance information which has been searched to the other device.

17. The non-transitory computer readable storage medium according to claim 16, the one or more programs further comprising instructions for:

obtaining the maintenance record from the other device.

18. The non-transitory computer readable storage medium according to claim 16, the one or more programs further comprising instructions for:

generating the maintenance information as contents in a form which the other device can display or play.

19. The non-transitory computer readable storage medium according to claim 16, the one or more programs further comprising instructions for:

generating the maintenance information based on at least one of a resolution and a codec of the other device.

20. The non-transitory computer readable storage medium according to claim 15, the one or more programs further comprising instructions for:

generating a web screen for displaying the maintenance information; and linking data of the maintenance record to the maintenance information, and displaying the data of the maintenance record in the web screen.

* * * * *